(12) United States Patent
Hsu et al.

(10) Patent No.: US 8,151,244 B2
(45) Date of Patent: Apr. 3, 2012

(54) MERGING GRAPHICAL PROGRAMS BASED ON AN ANCESTOR GRAPHICAL PROGRAM

(75) Inventors: Ray Hsu, Austin, TX (US); Mohammed Kamran Shah, Austin, TX (US); Duncan G. Hudson, III, Austin, TX (US); Yixin Guo, Austin, TX (US); Jonathan P. Fournie, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1196 days.

(21) Appl. No.: 11/829,364

(22) Filed: Jul. 27, 2007

(65) Prior Publication Data

US 2007/0283322 A1 Dec. 6, 2007

Related U.S. Application Data

(63) Continuation-in-part of application No. 11/330,724, filed on Jan. 12, 2006, now Pat. No. 7,703,027.

(60) Provisional application No. 60/643,615, filed on Jan. 13, 2005.

(51) Int. Cl.
*G06F 9/44* (2006.01)

(52) U.S. Cl. ........................................ 717/113; 715/763

(58) Field of Classification Search .................. 717/122, 717/104–105
See application file for complete search history.

(56) References Cited

U.S. PATENT DOCUMENTS

| | | | |
|---|---|---|---|
| 4,991,176 A | 2/1991 | Dahbura et al. | |
| 5,481,741 A | 1/1996 | McKaskle et al. | |
| 5,633,813 A | 5/1997 | Srinivasan | |
| 5,781,720 A | 7/1998 | Parker et al. | |
| 5,861,882 A | 1/1999 | Sprenger et al. | |

(Continued)

FOREIGN PATENT DOCUMENTS

WO WO8907377 A1 8/1989

OTHER PUBLICATIONS

MathWorks, Simulink, Model-Base and System-Base design,Jun. 2001, Version 4 http://www.busim.ee.boun.edu.tr/~resources/sl_using.pdf.*

(Continued)

*Primary Examiner* — Li Zhen
*Assistant Examiner* — Duy Khuong Nguyen
(74) *Attorney, Agent, or Firm* — Meyertons Hood Kivlin Kowert & Goetzel, P.C.; Jeffrey C. Hood; Mark S. Williams

(57) ABSTRACT

System and method for merging graphical programs. Information is received regarding first, second, and third graphical programs, where the third graphical program is an ancestor graphical program of the first and second. The information is analyzed to determine differences among the graphical programs. The first and second graphical programs are merged based on the determined differences, generating a merged graphical program, which is displayed. The analyzing may include determining first differences between the first and third graphical programs, and determining second differences between the second and third graphical programs, where the merging includes: for each of at least a subset of the differences: if the difference does not conflict with any other differences, incorporating the difference into the merged graphical program; and if the difference conflicts with another difference, prompting the user to resolve the conflict, receiving user input resolving the conflict, and modifying the merged graphical program accordingly.

28 Claims, 22 Drawing Sheets

U.S. PATENT DOCUMENTS

| | | | |
|---|---|---|---|
| 5,878,050 A | 3/1999 | Brahme et al. |
| 5,974,254 A | 10/1999 | Hsu |
| 6,138,270 A | 10/2000 | Hsu |
| 6,249,882 B1 | 6/2001 | Testardi |
| 6,327,617 B1 | 12/2001 | Fawcett |
| 6,463,552 B1 | 10/2002 | Jibbe |
| 6,507,842 B1 | 1/2003 | Grey et al. |
| 6,546,524 B1 | 4/2003 | Chankramath et al. |
| 6,622,298 B1 | 9/2003 | Stamm |
| 6,647,513 B1 | 11/2003 | Hekmatpour |
| 6,654,911 B1 | 11/2003 | Miles |
| 7,069,343 B2 | 6/2006 | Goringe et al. |
| 7,120,545 B2 | 10/2006 | Benvenga et al. |
| 2002/0188701 A1 | 12/2002 | Brown et al. |
| 2003/0097438 A1 | 5/2003 | Bearden et al. |
| 2004/0034696 A1 | 2/2004 | Joffrain et al. |
| 2004/0153869 A1 | 8/2004 | Marinelli et al. |
| 2005/0240640 A1 | 10/2005 | Kaler et al. |
| 2006/0156294 A1 | 7/2006 | Fuller, III et al. |
| 2006/0168182 A1 | 7/2006 | Fuller, III et al. |
| 2006/0168183 A1 | 7/2006 | Fuller, III et al. |
| 2006/0190105 A1 | 8/2006 | Hsu et al. |

OTHER PUBLICATIONS

IBM Rational, Comparing and merging UML models in IBM Rational Software Architect, Jul. 12, 2005, http://www.ibm.com/developerworks/rational/library/05/712_comp2/.*

Rational Rose, Guide to team development, 2001, http://www.cse.sc.edu/~jimdavis/Tools/rose-docs/12653450-Rose-Guide-TeamDevel.pdf.*

J.R. Ullmann. An algorithm for subgraph isomorphism. J. ACM, 23(1):31-42, 1976.

F. Luellau, T. Hoepken, and E. Barke. A technology independent block extraction algorithm. In 21st Proceedings of the Design Automation Conference on Design automation, pp. 610-615. IEEE Press, 1984.

M. Takashima, A. Ikeuchi, S. Kojima, T. Tanaka, T. Saitou, and J. Ichi Sakata. A circuit comparison system with rule-based functional isomorphism checking. In Proceedings of the 25th ACM/IEEE conference on Design automation, pp. 512-516. IEEE Computer Society Press, 1988.

Ebeling C. Gemini II: A Second Generation Layout Validation Program, Proceedings of the Conference on Computer Aided Design (ICCAD), pp. 322-235, 1988.

J. Laski and W. Szermer. Identification of program modifications and its applications in software maintenance. In Proceedings of IEEE Conference on Software Maintenance, pp. 282-290, Orlando, FL, Nov. 1992.

Samuel Bates and Susan Horwitz, "Incremental Program Testing using Program Dependence Graphs," Proceedings ACM Conference on Principles of Programming Languages, 1993.

Susan Horwitz, "Identifying the Semantic and Textual Differences Between Two Versions of a Program," Proceedings of the ACM SIGPLAN' 90 Conferencing on Programming Language, 1990.

H. Kalviainen and E. Oja. Comparisons of attributed graph matching algorithms for computer vision. In STeP-90 Finnish Articifical Intelligence Symposium, University of Oulu. pp. 354-368, 1990.

Edward H. Sussenguth, Jr. A Graph-Theoretic Algorithm for Matching Chemical Structures. p. 36-43, 1964.

Stephen H. Unger. GIT—A Heuristic Program for Testing Pairs of Directed Line Graphs for Isomorphism. Communications of the ACM, vol. 7, No. 1, Jan. 1964. p. 26-34.

D.G. Corneil and C.C. Gotlieb. An Efficient Algorithm for Graph Isomorphism. Journal of the Association for Computing Machinery, vol. 17, No. 1, Jan. 1970. p. 51-64.

H.G. Barrow, A.P. Ambler, and R.M. Burstall. "Some Techniques for Recognising Structures in Pictures," in Frontiers of Pattern Recognition, 1972.

A.T. Berztiss. A Backtrack Procedure for Isomorphism of Directed Graphs. Journal of the Association for Computing Machinery, vol. 20, No. 3, Jul. 1973. p. 365-377.

Ronald C. Read and Derek G. Corneil. The Graph Isomorphism Disease. The Journal of Graph Theory, vol. 1, 1977. p. 339-363.

D.G. Corneil and D.G. Kirkpatrick. A Theoretical Analysis of Various Heuristics for the Graph Isomorphism Problem. Society for Industrial and Applied Mathematics, vol. 9, No. 2, May 1980. p. 281-297.

Wen-Hsiang Tsai and King-Sun Fu. Error-Correcting Isomorphisms of Attributed Relational Graphs for Pattern Analysis. IEEE Transactions on Systems, Man, and Cybernetics, vol. 9, No. 12, Dec. 1979. p. 757-768.

Brendan D. McKay. Practical Graph Isomorphism. Congressus Numerantium, vol. 30, 1981. p. 45-87.

I. Ablasser and U. Jager. Circuit Recognition and Verification Based on Layout Information. 18th Design Automation Conference, 1981. p. 684-689.

Miles Ohlrich, Carl Ebeling, Eka Ginting, and Lisa Sather. SubGemini: Identifying SubCircuits using a Fast Subgraph Isomorphism Algorithm. 30th ACM/IEEE Design Automation Conference, 1993. p. 31-37.

"Using Simulink Version 4", Jun. 2001, pp. 1, 3.2, 4.5, 12.14-21; Mathworks.

International Search Report and Written Opinion for Application No. PCT/US2006/001335 mailed Jun. 21, 2006.

International Search Report and Written Opinion for Application No. PCT/US2006/001333 mailed Jul. 3, 2006.

Johnson, Laura, "Test and Measurement—Understanding Test Executives," Webpage www.testandmeasurement.com.content/news/ , Oct. 16, 2000, pp. 1-9.

Communication from foreign patent office for application No. PCT/US2006/001334, mailed on Oct. 2, 2006.

"Using SimuLink Version 5", pp. 14.13-14.20, 2002.

"SimuLink Performance Tools", Website, 2002.

"SimDiff User Manual", Ensoft Corporation, Apr. 12, 2006.

Jeff Kramer, Jeff Magee and Ken Ng; "Graphical Configuration Programming"; Computer; Oct. 1999; pp. 53-65; vol. 22, Issue 10; Los Alamitos, CA, U.S.A.

Henrik Baerbak Christensen; "Modularisation of Software Configuration Management"; Joint Modular Languages Conference; Sep. 6, 2000; pp. 1-13.

Kim Letkeman; "Comparing and merging UML models in IBM Rational Software Architect: Part 1"; Jul. 12, 2005; 29 pages.

"Model Based Collaboration Made Easy"; I-Logix RealTimes quarterly newsletter; Dec. 2005; 5 pages; vol. V, Issue 17.

"SimDiff 2.0"; 1 page; ENSOFT datasheet, 2006, from prior art of parent case U.S. Appl. No. 11/330,724.

"SimDiff User Manual Version 2.0"; Apr. 12, 2006; 17 pages; ENSOFT.

"Simulink Performance Tools 1"; Oct. 2002; 4 pages; The MathWorks.

"Using Simulink Version 5"; Jul. 2002; 50 pages; The MathWorks.

Akhil Mehra, John Grundy and John Hosking; "A Generic Approach to Supporting Diagram Differencing and Merging for Collaborative Design"; International Conference on Automated Software Engineering; Nov. 2005; 10 pages.

"Using Simulink, Merging Model Differences"; 2 pages; printed from the Internet: http://www.caspur.it/risorse/softappl/doc/matlab_help/toolbox/simulink/ug/performance_tools15.html.

"Using Simulink, The Graphical Merge Tool Window"; 2 pages; printed from, Internet: http://www.caspur.it/risorse/softappl/doc/matlab_help/toolbox/simulink/ug/performance_tools12.html, Jun. 21, 2002 using view source from the link.

"Using Simulink, Navigating Model Differences"; 1 page; printed from the Internet: www.caspur.it/risorse/softappl/doc/matlab_help/toolbox/simulink/ug/performance_tools14.html, Jun. 21, 2002 using view source from the link.

"Release Notes for Release 12.1, Graphical Merge Tool"; 1 page; printed from the Internet: http://www.phys.ufl.edu/docs/matlab/base/relnotes/slperfrm.html, Jun. 21, 2002 using view source from the link.

Prior Art Statement, Sep. 27, 2006, from prior art of parent case U.S. Appl. No. 11/330,724.

Susan Horwitz, Jan Prins and Thomas Reps; "Integrating Noninterfering Versions of Programs"; ACM Transactions on Programming Languages and System (TOPLAS); Jul. 1989; pp. 345-387; vol. 11, Issue 3.

Tom Mens; "Conditional Graph Rewriting as a Domain-Independent Formalism for Software Evolution"; Proceedings of the International Workshop on Applications of Graph Transformations with Industrial Relevance; 2000; 17 pages.

Tom Mens; "A State-of-the-Art Survey on Software Merging"; IEEE Transactions on Software Engineering; May 2002; pp. 449-462; vol. 28, No. 5.

Communication from foreign patent office for European Application No. 06718413.5 dated Aug. 25, 2011, 7 pages.

* cited by examiner

MERGING GRAPHICAL PROGRAMS BASED ON AN ANCESTOR GRAPHICAL PROGRAM

PRIORITY DATA

This application is a continuation-in-part of U.S. patent application Ser. No. 11/330,724, titled "Merging Graphical Programs", filed Jan. 12, 2006 now U.S. Pat. No. 7,703,027, whose inventors were Ray Hsu, Mohammed Kamran Shah, Duncan Hudson, Yixin Guo and Jonathan P. Fournie, and which claims benefit of priority of U.S. Provisional Application Ser. No. 60/643,615 titled "Merging Graphical Programs", filed Jan. 13, 2005, whose inventors were Mohammed Kamran Shah and Duncan Hudson.

FIELD OF THE INVENTION

The present invention relates to the field of graphical programming, and more particularly to a system and method for merging graphical programs based on an ancestor graphical program.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

The development and maintenance of software systems often involves analysis or comparison of different versions of a software program, or of similar software programs. For example, many program development environments support some type of "difference" functionality, where to programs are compared and their differences determined and presented to a user. This functionality is relatively straightforward to implement in text-based programming systems, primarily because of the linear nature of text. Such functionality in graphical programming systems is substantially more challenging to implement, substantially due to the spatial nature of graphical program layouts. Additionally, the presence of a sub-VIs, i.e., graphical sub-programs, further complicates such functionality, effectively adding an additional dimension to the program space. The first commercial graphical differencing tool was provided by National Instruments Corporation in the LabVIEW graphical programming development environment, v5.0. Methodologies used in this product are described in U.S. Pat. Nos. 5,974,254 and 6,138,270.

A related functionality is program merging, in which the differences between two programs are reconciled in one or both programs, or in a third program. In this way, different versions of a program may be merged to update the program, e.g., for version control etc. There are numerous well-known solutions for text-based merging. Text-based merge is generally a straightforward problem, since differences are expressed in a two-dimensional fashion (line, column) that represents a sequential block of text. For example, (line 3, column 5) through (line 5, column 55) in the first text file is different than (line 4, column 9) through (line 7, column 47) of the second file. Merging the difference from the first file to the second file simply involves replacing the text block that represents the difference in the first file with the text block representing the corresponding difference in the second file.

However, there are no known prior art technologies that provide this merge functionality for graphical programs. Graphical merging is significantly more challenging than text-based merging, since graphical differences are represented by discontinuous sets of connected objects. Furthermore, as noted above, graphical difference involves a three-dimensional problem space since nested graphs (use of sub-VIs, i.e., graphical sub-programs) are present in the most general case.

Thus, systems and methods for performing graphical program merge operations are desired. Additionally, intelligent placement and graphical layout of merged program elements to preserve the readability of merged graphical programs is desired.

SUMMARY OF THE INVENTION

Embodiments of a system and method for merging graphical programs are described. Information regarding a first graphical program, a second graphical program, and a third graphical program, may be received. The first graphical program may include a first plurality of interconnected nodes that visually indicate functionality of the first graphical program, the second graphical program may include a second plurality of interconnected nodes that visually indicate functionality of the second graphical program, and the third graphical program may include a third plurality of interconnected nodes that visually indicate functionality of the third graphical program. The third graphical program is preferably an ancestor graphical program of the first and second graphical programs. In other words, both the first and second graphical programs have been derived or developed from the third graphical program. For example, in one embodiment, different developers may have "checked out" respective copies of the third graphical program from a version control system, and performed respective (and likely divergent) modifications on their respective copies, thus generating the first and second graphical programs. In some embodiments, a graphical program may comprise a plurality of nodes representing components in a represented system, and optionally interconnections representing physical, logical, and/or data coupling between the components or resources. Note that in other embodiments, the graphical programs may be of any type, e.g., the represented systems may each comprise one or more of: an industrial automation system, a process control system, or a test and measurement system, among others. In a preferred embodiment, at least one of the graphical programs comprises a measurement system program.

The information may include any of a variety of forms. For example, in various embodiments, the information regarding the graphical programs may include one or more of: an abstract representation of the graphical program, e.g., a data structure or description specifying the plurality of nodes, and optionally, interconnections, component attributes, e.g., identification, sub-components, configuration data, version information, descriptions, deployment, and so forth. Thus, the information regarding each graphical program may include one or more of: the graphical program, a graph of the graphical program, a description of the graphical program, or a data structure specifying the graphical program. The information for each graphical program may also include information related to hardware associated with the graphical programs, such as, for example, execution targets for nodes in the programs, and may also include information related to the connectivity or associations between the components of the graphical programs. In some embodiments, the information may include any data or structure from which differences among the graphical programs may be determined. In one embodiment, the information may include the differences themselves, e.g., the information may include the results of a graphical difference method or process.

The information may be analyzed to determine differences among the first, second, and third graphical programs. For example, in one embodiment, the analyzing may include analyzing the information to determine first differences between the first graphical program and the third graphical program, and analyzing the information to determine second differences between the second graphical program and the third graphical program. Thus, the determined differences may capture the respective divergent development paths of the first and second graphical programs from the third (parent) program.

In preferred embodiments, the analysis of the information to determine differences among the first, second, and third graphical programs may include determining differences between nodes, deployment of nodes, implementation code, configuration data, and/or hardware devices associated with nodes, e.g., target devices for deployment of the nodes. Differences between nodes may include differences in number and types of the nodes, versions of the nodes, configuration of the nodes, source code of the nodes, sub-nodes of the nodes, and/or deployment of the nodes, among others. Differences in interconnectivity of nodes may include differences in data flow between nodes, signal flow between nodes, control flow between nodes, dependencies between nodes, calling relationships between nodes, and/or physical connectivity between hardware devices associated with nodes, among others.

Analyzing the information to determine the differences may be performed in accordance with specified difference criteria, such as, for example, tolerance, category, cost, or performance, among other criteria. Moreover, the method may include receiving user input specifying the difference criteria to be used in the analysis, for example, the user input may specify respective portions of the first, second, and/or third graphical programs for analysis. The analyzing the information to determine the differences and the merging may be performed with respect to the specified portions of the first, second, and/or third graphical programs.

The first graphical program and the second graphical program may then be merged based on the determined differences to generate a merged graphical program. In some embodiments where the analyzing determines first and second differences, as described above, the merging may be performed based on the first and second differences. For example, the merging may include, for each difference of at least a subset of the first and second differences: if the difference does not conflict with any others of the first and second differences, incorporating the difference into the merged graphical program, e.g., automatically; however, if the difference conflicts with another difference of the first and second differences, the user may be prompted to resolve the conflict, user input may be received resolving the conflict, including specifying one or more modifications to the merged graphical program, and the merged graphical program may be modified in accordance with the specifying. Note that two differences are considered to conflict if they affect the same part of the original graphical program in such a way that both changes cannot be applied at the same time without compromising each other. Thus, the differences may be analyzed in pairs. For example, in one embodiment, each difference of the first differences may be processed by comparing it to each difference of the second differences to determine if the pair conflicts or not.

In one embodiment, the user may specify the one or more modifications to the merged graphical program by selecting one of the difference or the other difference for incorporation into the merged graphical program, and the merging may include incorporating the selected difference into the merged graphical program. In other words, the user may select which of the conflicting differences to use, and the method may modify the merged graphical program to include the selected difference, e.g., automatically. In another embodiment, the user may specify the one or more modifications to the merged graphical program by manually editing the merged graphical program, e.g., using a graphical program editor (under the development environment), to resolve the conflict. Thus, the method may include resolving conflicts (between differences) by letting the user choose one of the differences and/or make edits to the merged graphical program.

Note that in various embodiments, the merged graphical program may be generated from a copy of the third program, or generated from scratch, e.g., adding all elements from the first and second graphical programs that are common to both programs, then merging the differences as described above. In a preferred embodiment, prior to merging, the merged graphical program may include or be a copy of the third graphical program, where merging includes modifying the copy of the third graphical program. In alternate embodiments, a copy of the first or second graphical program may be used as a basis for the merged graphical program.

Finally, the merged graphical program may be displayed on a display device, e.g., a computer monitor. In one embodiment, displaying the merged graphical program may include graphically indicating at least a portion of the differences among the first, second, and third graphical programs in the merged graphical program. For example, the differences may be indicated via one or more of highlighting, a plurality of colors, a plurality of line styles, or moving dashed lines, among other types of indicators. In one embodiment, displaying the merged graphical program may include displaying a textual description of at least a portion of the differences, e.g., indicating from which of the first and second graphical programs the difference originated, whether the difference were modified, etc., as desired.

Thus, in summary, given an original graphical program and two others that have been changed from the original, embodiments of the three-way merge process described above may use all three graphical programs to produce a fourth, merged, graphical program that incorporates changes from both of the changed graphical programs, where changes that do not conflict are automatically merged, and where user input resolves those changes that do conflict.

BRIEF DESCRIPTION OF THE DRAWINGS

A better understanding of the present invention can be obtained when the following detailed description of the preferred embodiment is considered in conjunction with the following drawings, in which.

Figure 1A:
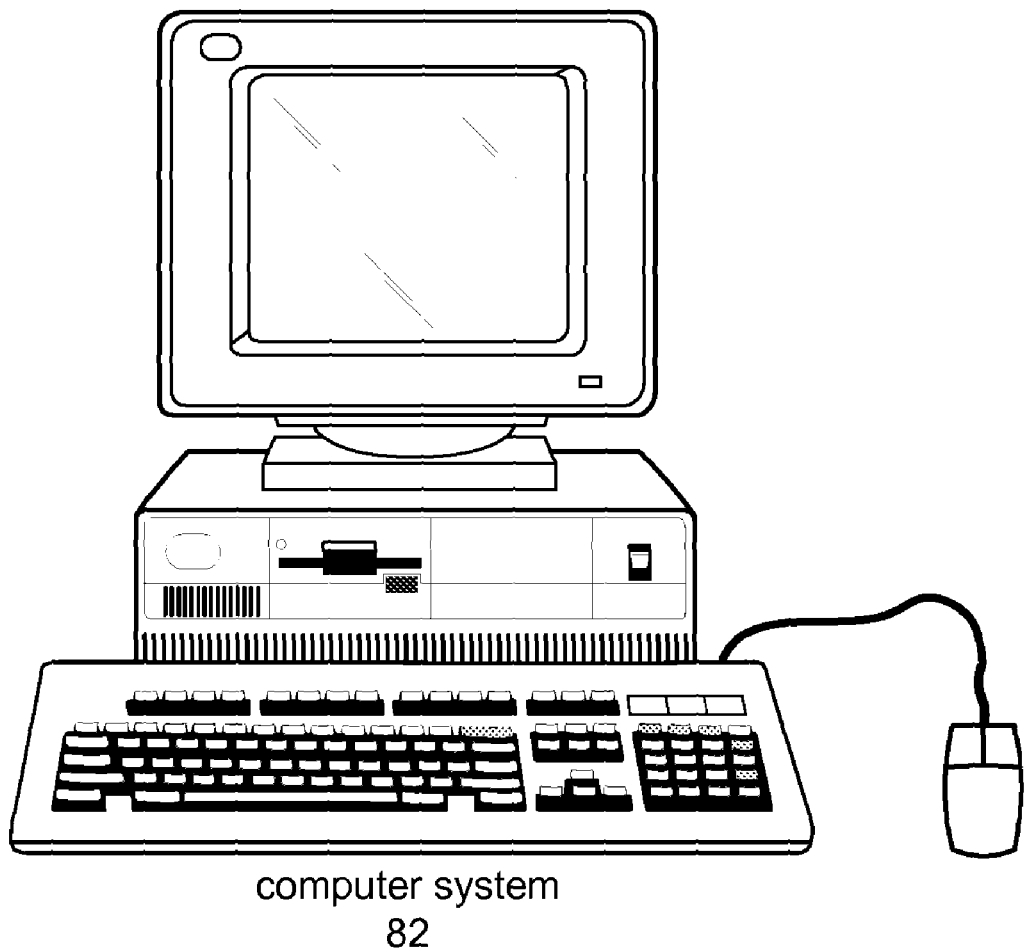
FIG. 1A illustrates a computer system operable to implement various embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. patent application Ser. No. 11/330,724, titled "Merging Graphical Programs", filed Jan. 12, 2006.

U.S. Provisional Application Ser. No. 60/643,615 titled "Merging Graphical Programs", filed Jan. 13, 2005.

U.S. patent application Ser. No. 08/870,262 titled "Method for Detecting Differences Between Graphical Programs," filed on Jun. 6, 1999, and which issued as U.S. Pat. No. 5,974,254 on Oct. 26, 1999.

U.S. patent application Ser. No. 09/339,340 titled "System, Method and Memory Medium for Detecting Differences Between Graphical Programs," filed on Oct. 24, 2000, and which issued as U.S. Pat. No. 6,138,270 on Oct. 24, 2000.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment", filed Sep. 22, 1993.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 5,990,906 titled "Undo Feature for a Graphical Programming System," filed Aug. 19, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 10/338,533 titled "Network-Based System which Provides a Database of Measurement Solutions", filed Jan. 8, 2003.

U.S. Patent Application Publication 20030036874 (Ser. No. 10/101,512) titled "Network-based System for Configuring a Measurement System using Configuration Information Generated based on a User Specification", filed Mar. 19, 2002.

U.S. Patent Application Publication 20030036876 (Ser. No. 10/120,257) titled "Network-based System for Configuring a Measurement System using Configuration Information Generated based on a User Specification", filed Apr. 10, 2002.

U.S. patent application Ser. No. 10/101,508 titled "Network-based System for Configuring a Measurement System using Software Programs Generated based on a User Specification", filed Mar. 19, 2002.

U.S. patent application Ser. No. 10/101,507 titled "Network-based System for Configuring a Programmable Hardware Element in a Measurement System using Hardware Configuration Programs Generated Based on a User Specification", filed Mar. 19, 2002.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Configuration Diagram—a graphical representation of a system, including a plurality of icons or nodes that represent hardware and/or software components or resources of the system, optionally interconnected, corresponding to connections and/or associations between the components or resources, i.e., physical and/or data coupling between the components or resources.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments Corporation, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute software programs for determining and/or merging differences between configuration diagrams. Various embodiments of methods for determining and merging differences between configuration diagrams are described below.

As shown in FIG. 1A, the computer system 82 may include a display device operable to display graphical programs. The display device may also be operable to display a graphical user interface for user interaction with software and/or hardware implementing embodiments of the present invention. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs, e.g., graphical programs, which are executable to perform the methods described herein. Also, the memory medium may store a programming development environment application used to create and/or execute such programs, e.g., the LabVIEW graphical programming development environment provided by National Instruments Corporation. The memory medium may also store operating system software, as well as other software for operation of the computer system. Various embodiments further include receiving or storing instructions and/or data implemented in accordance with the foregoing description upon a carrier medium.

Figure 1B:
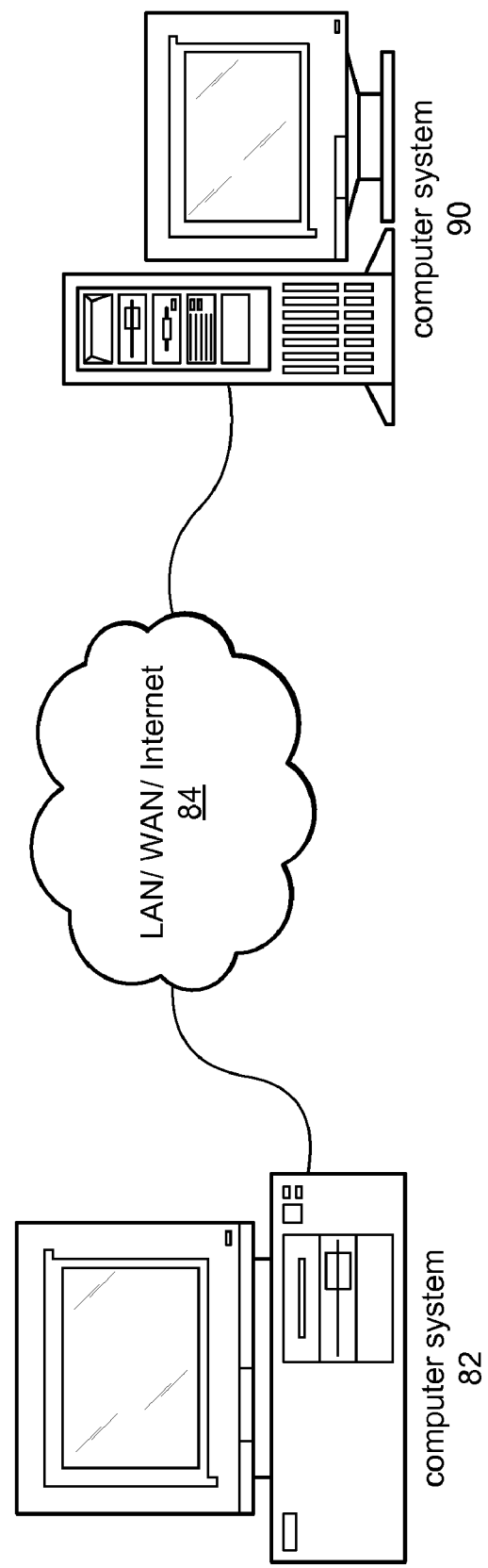
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others.

In some embodiments, the computer systems 82 and 90 may implement and/or execute software programs in a cooperative or distributed manner. For example, in embodiments that utilize graphical programming methodologies, the computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device 190 connected to the computer system 82. The device 190 may include a programmable hardware element and/or may include a processor and memory medium which may execute a real time operating system. In one embodiment, the graphical program may be downloaded and executed on the device 190. For example, an application development environment with which the graphical program is associated may provide support for downloading a graphical program for execution on the device in a real time system.

As will be described in more detail below, in some embodiments, the computer system 82 may be coupled to additional devices, e.g., comprised in the computer system 82, comprised in the second computer system 90, and/or coupled to one or both of the computer systems 82 and 90 via the network 84. Software executing on the computer system 82 may be operable to receive graphical program from, or generate graphical program based on, the devices (including computer system 90) on the network 84.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, e-commerce, games, etc.

Figure 2A:
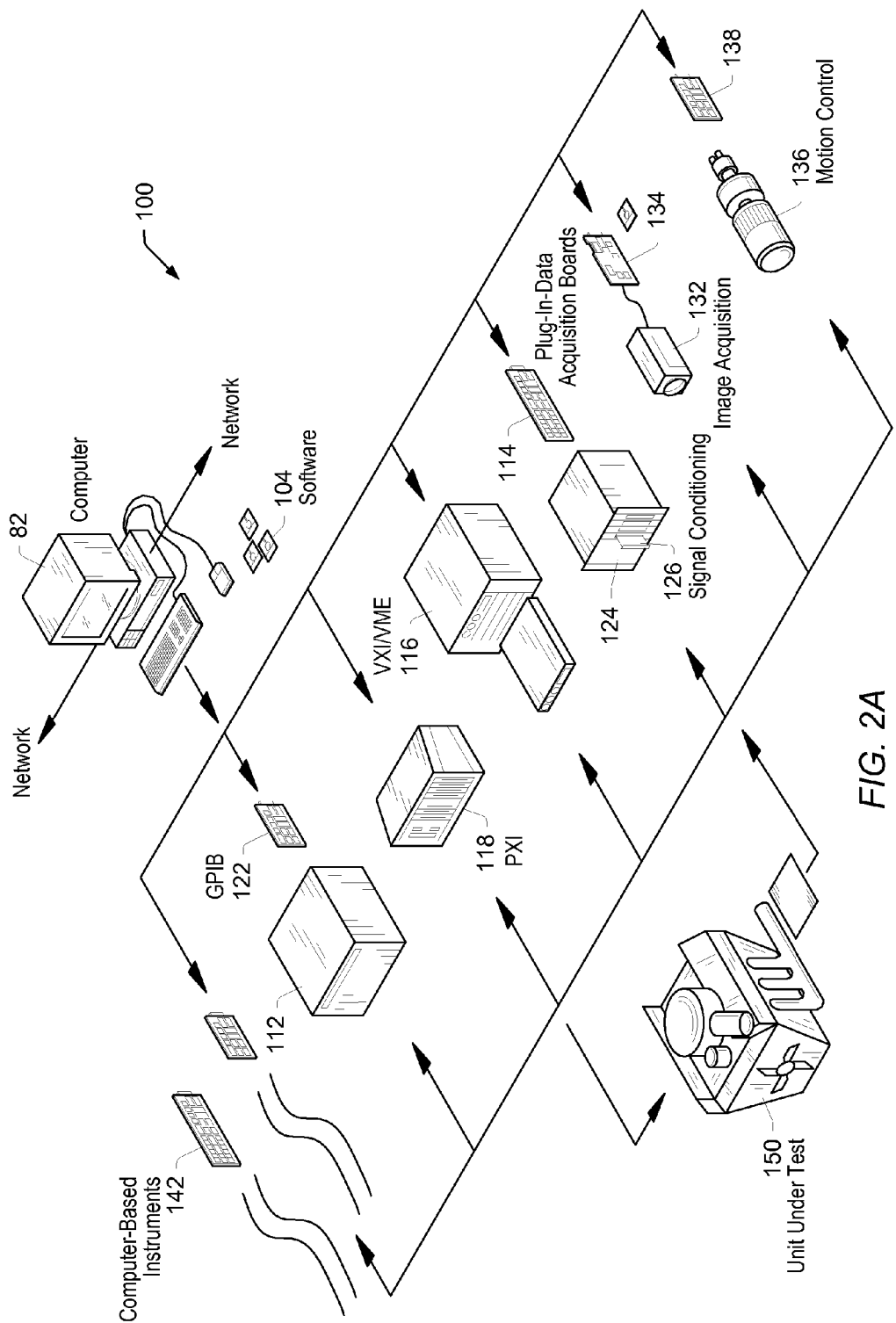
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
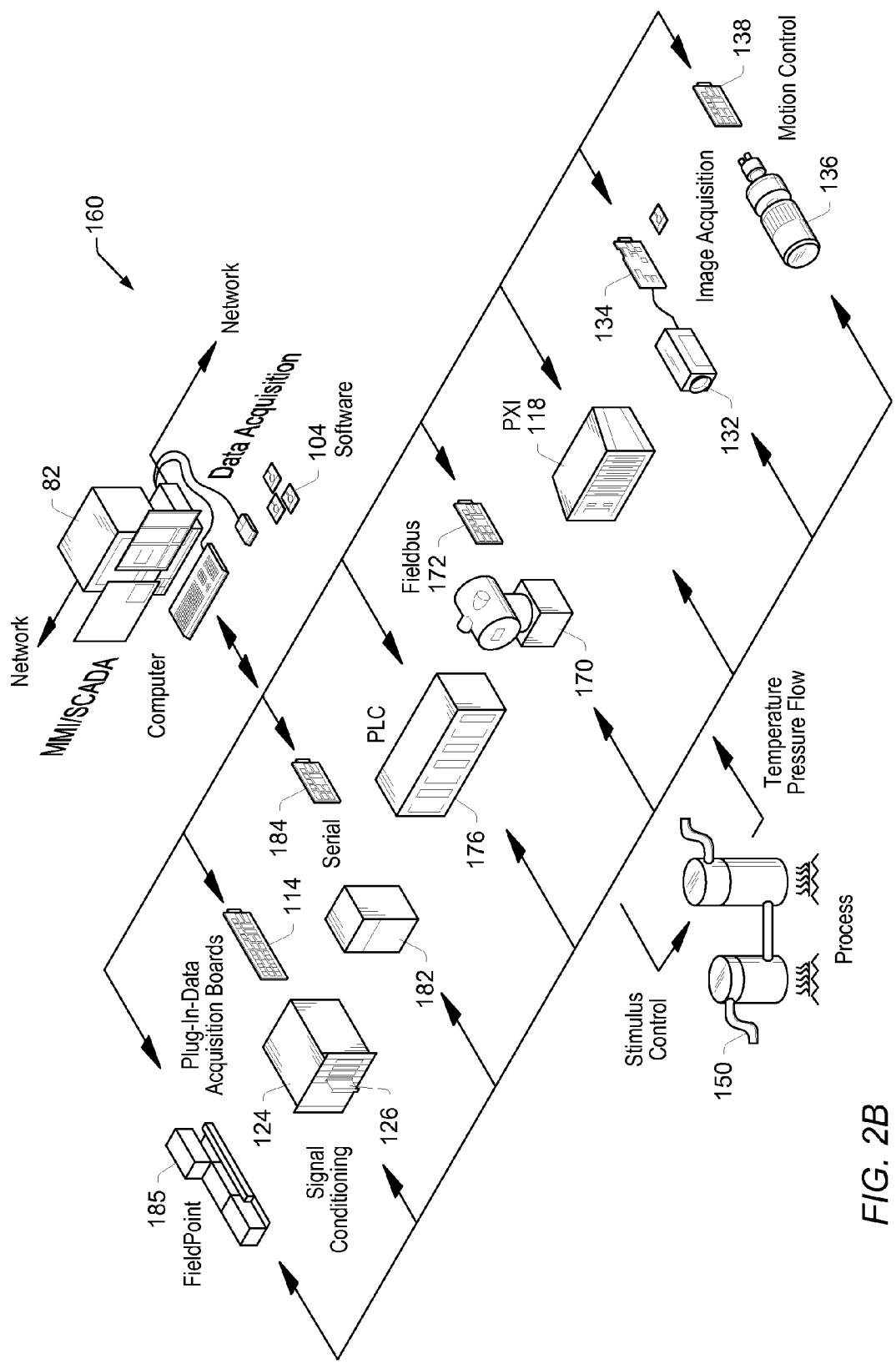
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments Corporation, among other types of devices.

In the embodiments of FIGS. 2A and 2B, described above, one or more of the various devices may couple to each other over a network, such as the Internet. In some embodiments, one or more programs according to the present invention may be operable to generate and/or analyze graphical programs used in conjunction with these devices. For example, software executing on computer system 82 may analyze graphical programs that each utilize one or more of such devices (or others), and may merge the graphical programs, where the merged graphical program operates in conjunction with a union of the utilized devices. Further details regarding the merging of graphical programs is provided below.

As noted above, in some embodiments, at least a portion of the software may be implemented in a graphical programming language, such as the "G" graphical programming language provided by National Instruments Corporation.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 3:
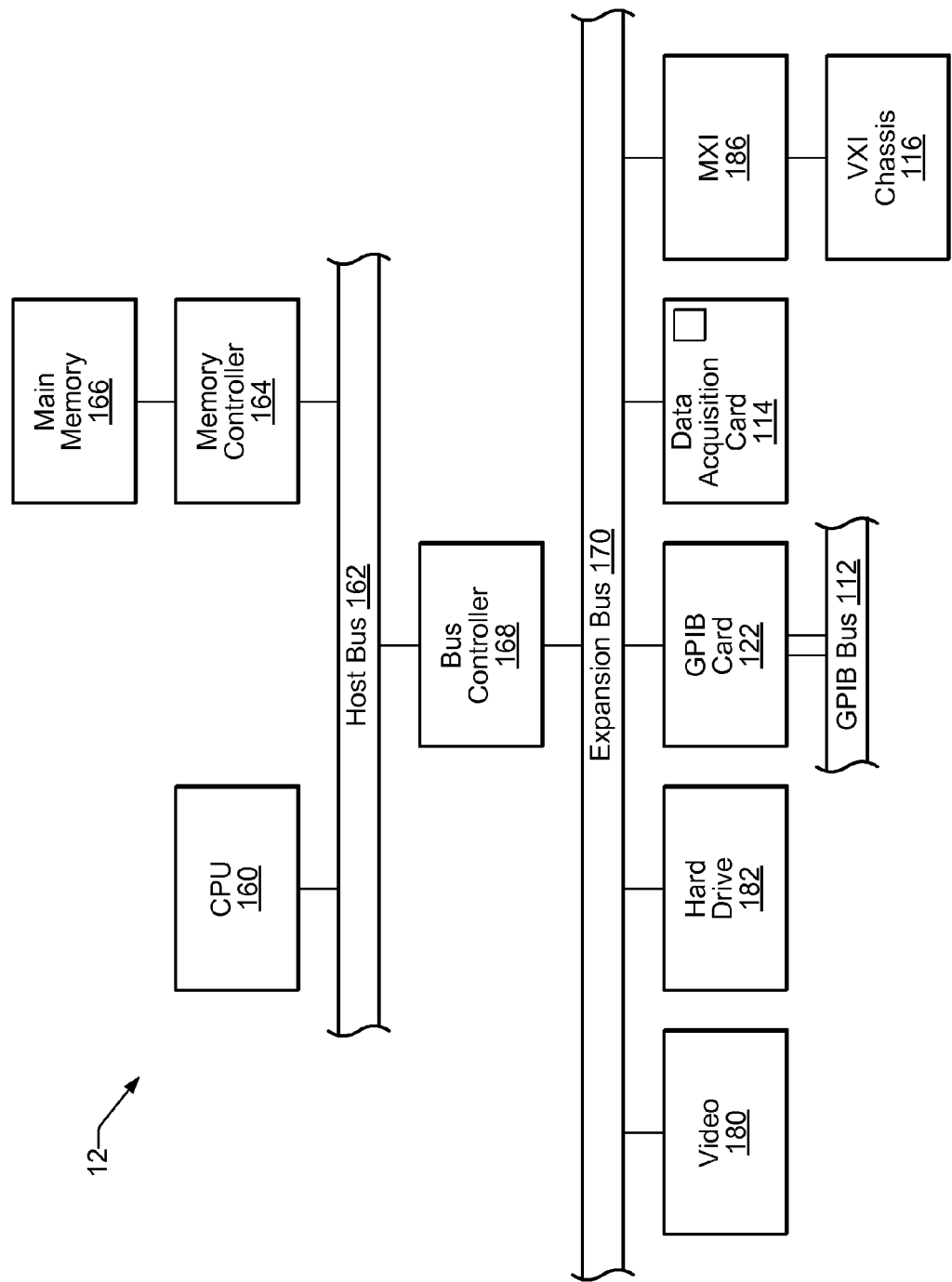
FIG. 3 is an exemplary block diagram of the computer systems of FIGS. 1A, 1B, 2A and 2B.

FIG. 3—Computer System Block Diagram

FIG. 3 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 3 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store graphical programs, as well as software according to embodiments of the present invention for analyzing the graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory that may execute a real time operating system. The device 190 may also or instead comprise a programmable hardware element. The computer system may be operable to deploy a program to the device 190 for execution of the program on the device 190. As noted above, in some embodiments, the program may be a graphical program. For example, the deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 4:
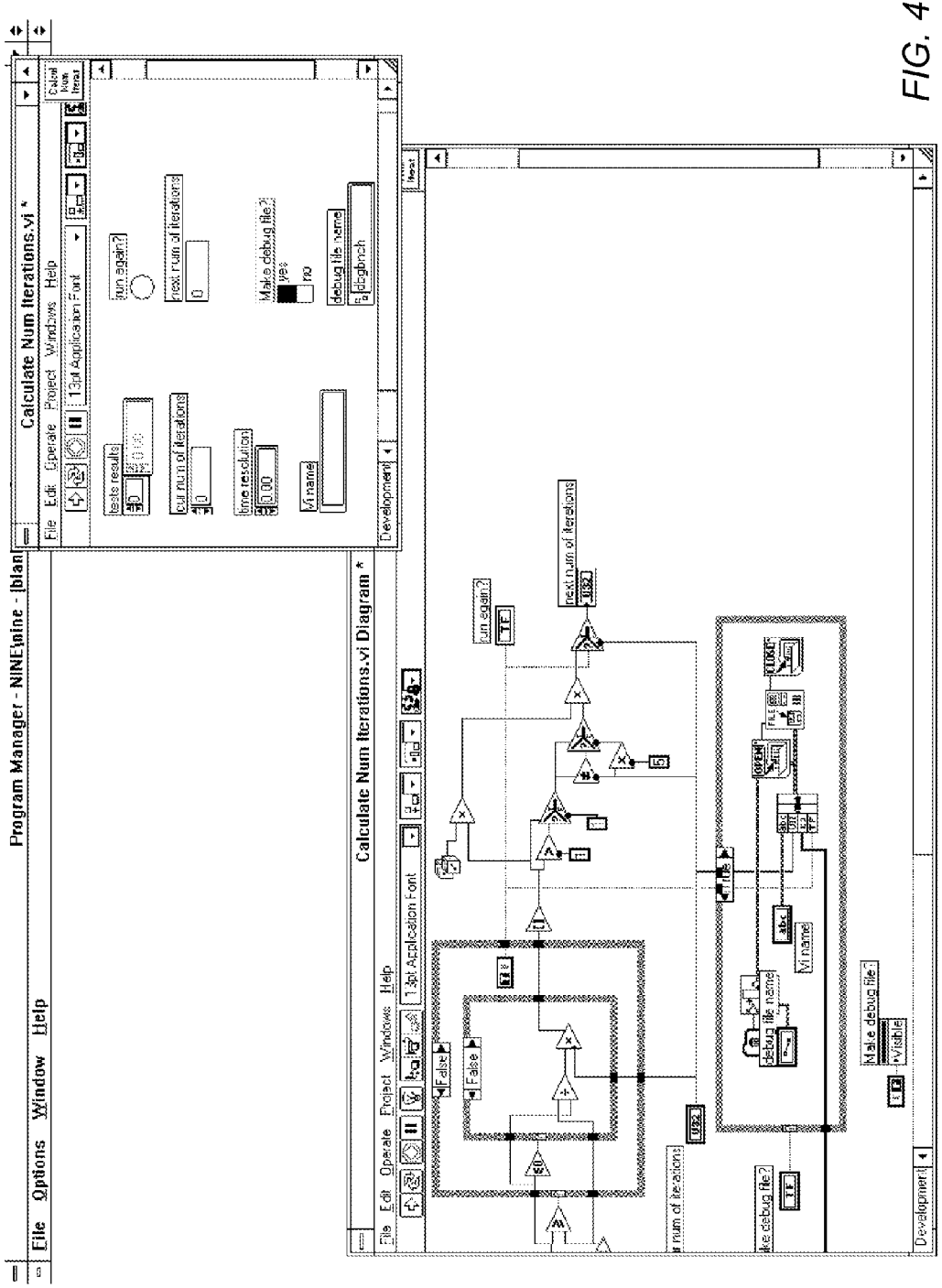
FIG. 4 illustrates an example graphical program, according to one embodiment.

FIG. 4—Example Graphical Program

As noted above, a graphical program may comprise a plurality of nodes or icons, where the plurality of interconnected nodes or icons visually indicate functionality of the program. The nodes may represent software and/or hardware functionality, and the graphical program may comprise a data flow, control flow, or execution flow diagram, representing the functionality of the software and/or hardware.

FIG. 4 illustrates an example graphical program or virtual instrument such as may be used in a variety of systems. It should be noted, however, that the graphical programs described herein are intended to be exemplary only, and are not intended to limit the graphical programs used in or by embodiments of the present invention to any particular form, function, or appearance. The graphical programs used herein were created using the LabVIEW graphical programming system, provided by National Instruments Corporation, although any other types of graphical programs and/or graphical programming systems are also contemplated In preferred embodiments, each graphical program includes a plurality of objects. An object may be defined as having attributes, or properties, and methods according to the notion of objects in the art of object oriented programming. Preferably, an object has an associated icon which visually represents the object, as shown in FIG. 4. As used herein, the term "node" refers to an icon in the graphical program, and may also include the object that it represents. Preferably, the graphical program comprises a block diagram portion and a user interface panel portion, and the objects are arranged in these two portions: the block diagram portion and the user interface panel portion. Alternatively, the objects may be comprised solely in a block diagram or graphical program portion. In this embodiment, user interface objects, if present, may be comprised in the block diagram portion.

A user interface panel is shown in the window in the upper right hand portion of FIG. 4 and a block diagram is shown in the window in the lower left hand portion of FIG. 4. In the case of instrumentation control applications, the user interface panel is typically referred to as an instrument front panel, or front panel. The objects in the user interface panel include controls and indicators. Controls are used to receive input, typically from a user, and to provide the input data to the block diagram. Indicators are used to receive output data from the block diagram and display the output data to the user. Examples of indicators are graphs, thermometers, meters and gauges. Examples of controls are slides, knobs, switches, buttons and dials. In one embodiment, the controls and indicators include clusters of controls and indicators arranged in a hierarchical manner.

Preferably, the user interface panel comprises a directed acyclic graph of objects. In particular, the user interface panel may comprise a hierarchical tree structure wherein the nodes of the tree are the user interface panel objects. A graph may be defined as a finite non-empty set of vertices and a set of edges such that every edge connects exactly two vertices. Preferably, any two vertices may be connected by zero or more edges. In the user interface panel, the vertices are the control and indicator objects and the edges are the hierarchical relationship between the objects. The direction of the edges are determined by the level in the hierarchy. That is, the direction is from higher level objects to lower level objects. The connectivity of an object is related to the other objects to which it is connected, i.e., its neighboring objects, and the edges by which it is connected to its neighboring objects.

The block diagram is the portion of the graphical program which includes the graphical code to perform the calculations and operations of the graphical program application. The objects in the block diagram include terminals associated with the front panel controls and indicators. The front panel terminals are used to input and output data between the front panel controls/indicators and the function blocks of the block diagram. The block diagram objects also include function nodes, such as mathematical operators; code execution structures such as for loops, while loops, case statements, and variable references; string functions; file I/O nodes; communication nodes; instrument I/O nodes; and data acquisition nodes, for example. Preferably, the block diagram nodes are connected by data paths, or signals, which determine the flow of data through the block diagram.

In the preferred embodiment, the block diagram comprises a data flow diagram arranged as a directed acyclic graph. The vertices of the graph are the terminals and nodes of the block diagram. The edges of the graph are data path signals which connect the nodes and terminals. The nodes themselves comprise one or more terminals which are connected to the edges. The direction of the edges of the graph is determined by the nodes themselves. For example, if a signal is connected between an output terminal of a first node and an input terminal of a second node, then the direction of data flow on that edge is from the output terminal to the input terminal.

Merging Graphical Programs

Figure 6:
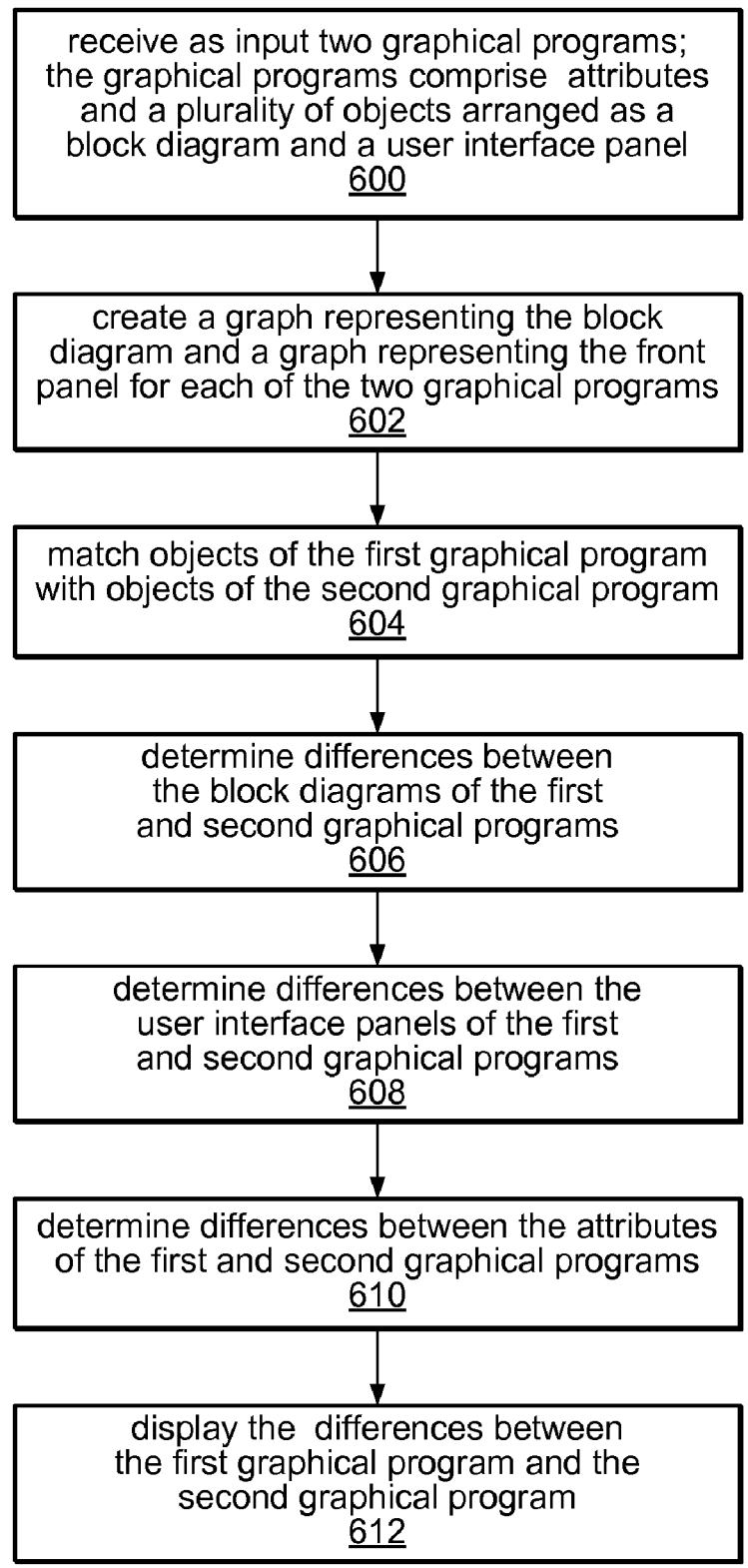
FIG. 6 is a flowchart diagram illustrating one embodiment of the differencing process of the method of FIG. 5.

Graphical differencing, an example of which is described below with reference to FIG. 6, is an essential tool for source code control where graphical programming and modeling applications are used. Graphical merge is a natural extension of these ideas, and has broad utility in the development and maintenance of graphical program-based systems. Graphical merge may be used to copy and paste differences (e.g., automatically) from one graphical program, which may be represented by or referred to as a graph (where a graph comprises a collection of nodes and edges, as is well known to those skilled in the programming arts), to another. For example, the merge process may be used as a feature of source code control to: manually merge changes made to a local file to the version in source code control, manually merge changes in source code control to the local version, and automatically merge changes between two branches where there is a common ancestor version, among other uses.

Figure 5:
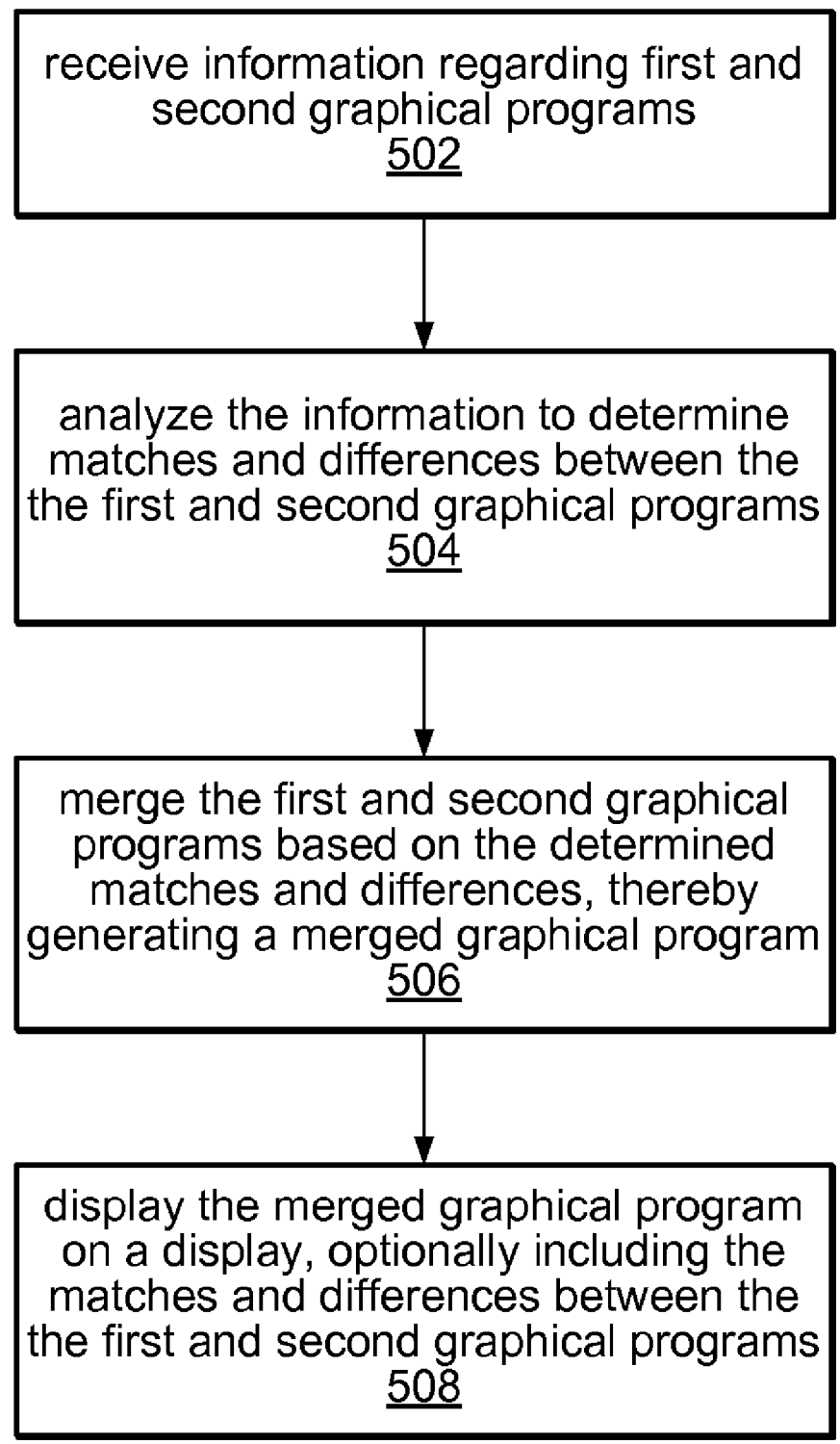
FIG. 5 is a flowchart diagram illustrating one embodiment of a method for merging graphical programs.

FIG. 5—Method for Merging Graphical Programs

FIG. 5 illustrates a computer-implemented method for merging graphical programs, according to one embodiment. The method shown in FIG. 5 may be used in conjunction with any of the computer systems or devices shown in the above-described Figures, among other devices. In various embodiments, some of the method elements shown may be performed concurrently, in a different order than shown, or may be omitted. Additional method elements may also be performed as desired. As shown, this method may operate as follows.

First, in 502, information regarding first and second graphical programs may be received, where, as noted above, each graphical program comprises a respective plurality of interconnected nodes that visually indicate functionality of the graphical program. Henceforth, in this document the program elements, e.g., icons, controls, indicators, etc., comprised in or represented in the graphical programs may be referred to by the term "nodes". In a preferred embodiment, at least one of the graphical programs is comprised in a measurement system.

In various embodiments, the information regarding the first and second graphical programs may be any type of information related to or characterizing the graphical programs. For example, in some embodiments the information may include the graphical programs themselves. In other embodiments, the information regarding a graphical program may include one or more of: an abstract representation of the graphical program, e.g., a data structure or description specifying the plurality of nodes, and optionally, their interconnections, VI attributes, e.g., identification, sub-VIs, configuration data, version information, descriptions, underlying implementation, i.e., code, deployment (i.e., the location and/or execution target of a component), and so forth. Thus, the information regarding the first graphical program may include one or more of: the first graphical program, a graph of the first graphical program, a description of the first graphical program, or a data structure specifying the first graphical program, among others.

Thus, the information for each graphical program may include information related to the nodes and their attributes, and may also include information related to the connectivity or associations between the nodes.

Note that the first and second information may be received in any of a variety of ways. For example, in various embodiments, the information regarding the first and/or second graphical program may be provided by the user, e.g., via a GUI displayed on the client system, and/or by an external system, e.g., by a server system coupled to the client system. In some embodiments, the method may include querying the client system and/or the server to determine the first and/or second information.

In some embodiments, the user may provide information describing or specifying a task or system functionality, e.g., via a GUI displayed on the client system and provided by the client system and/or the server computer system, e.g., via a GUI displayed on a vendor's website. The method may then include automatically or programmatically determining a graphical program (or programs) suitable for performing the specified task, i.e., determining the first information. For example, based on the information describing or specifying the task or desired functionality, the server (or client) may query a database of graphical programs (or their descriptions) to determine or select a graphical program suitable for performing the desired task. For example, an internal or external database or equivalent may be queried to determine the second information and/or the second graphical program. Note that as used herein the term "database" may include a distributed database that comprises a plurality of databases distributed over a network.

Figure 8A:
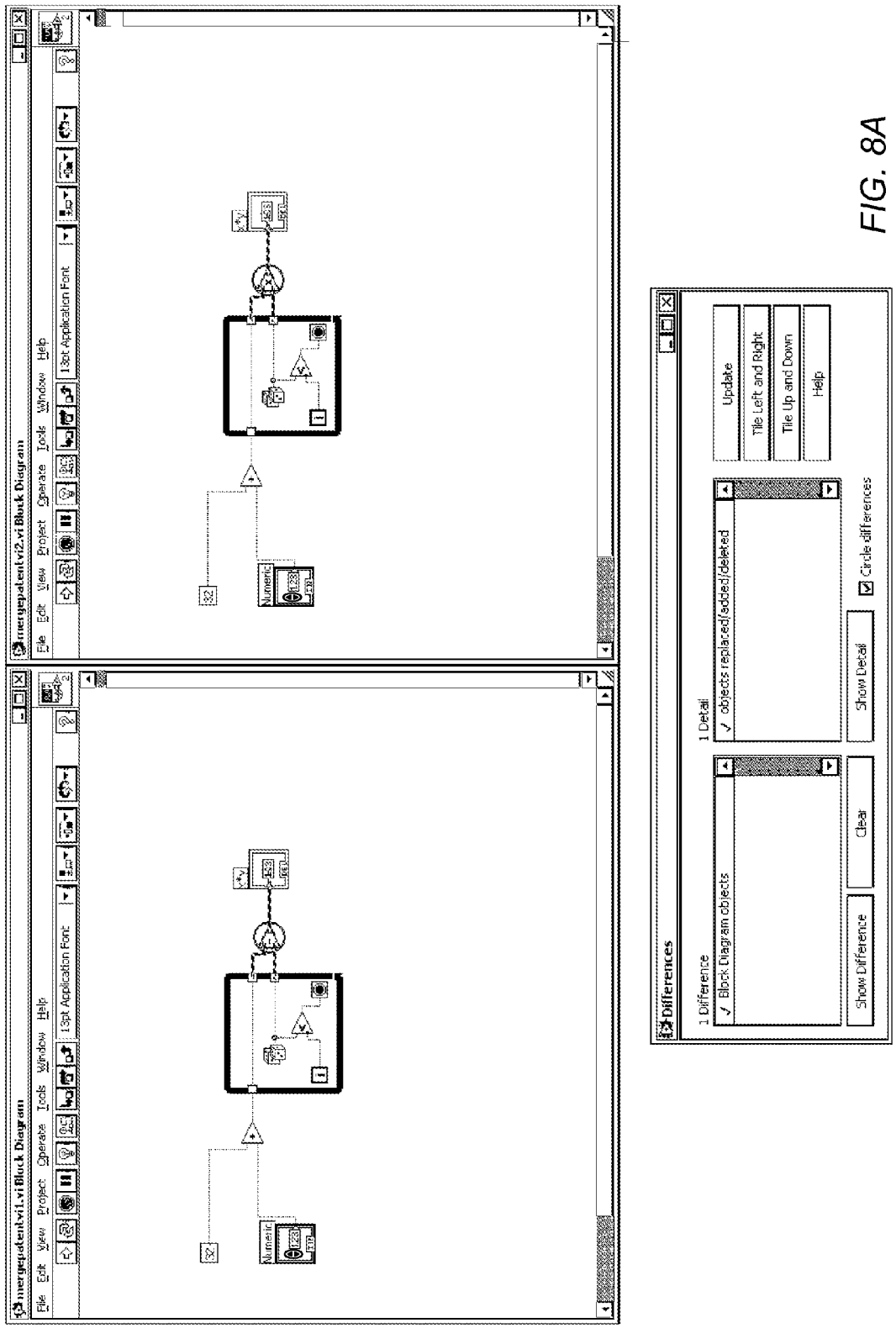
FIGS. 8A-8G are exemplary screenshots illustrating some embodiments of the method of FIG. 5.

FIG. 8A illustrates two simple example graphical programs (block diagrams) to which a graphical differencing or "diff" function has been applied. Note that the block diagrams of the two graphical programs are displayed side by side in FIG. 8A. More specifically, FIG. 8A shows two versions of a virtual instrument (VI) in which, beginning on the left of each block diagram, a constant with value "32" (top) is added to a numeric value input via a front panel terminal labeled "Numeric" via an add operator, labeled "+". The result is input into a loop structure, which loops until a value provided by a random number generator (dice icon) each cycle is less than a loop counter, labeled "i". Upon cessation of the looping, the random number for that cycle (which is less than the final loop counter value) and the original sum input into the loop are provided to another operator. In the first or left block diagram, the operator is a subtraction operator, which subtracts the random number from the original sum. In the second or right block diagram, the operator is a multiplication operator, which computes a product of the original sum and the random number. In each case, the result is then provided to another front panel terminal, labeled "x*y", e.g., for display on a front panel of the graphical program (not shown).

As indicated in 504, the first and second information received in 502 above may be analyzed to determine matches and differences between the two programs.

In some embodiments, analyzing the first and second information to determine matches and differences between one or more of: the nodes comprised in the first and second programs, sub-programs, referred to as sub-VIs comprised in the first and second graphical programs, configuration data of the first and second graphical programs, or deployment of the programs and/or nodes, among others. In some embodiments, matches and differences between the nodes of the first and second graphical programs may include matches and differences in one or more of: software versions, number and types of associated hardware, deployment, source code of the programs, deployment of the programs, or configuration of the programs, among others.

In some embodiments, the determined matches and differences between the first graphical program and the second graphical program may also include matches and differences in interconnectivity of nodes or objects comprised in the first and second graphical programs, which, depending on the nature of the programs, may include matches and differences in one or more of: physical or logical connectivity between nodes or objects, data flow or signal flow between nodes or objects, dependencies between nodes, or calling relationships between nodes, among others.

The analysis and merging of the first and second graphical programs may be performed in any of a variety of ways. For example, in one embodiment, the graphical programs, or representations thereof, may be traversed or "walked", to enumerate their respective nodes and connections, e.g., if the graphical programs are represented by respective graphs (nodes and edges), each graph may be traversed, where each node and connection is recorded, e.g., in respective lists.

Thus, in some embodiments, the analyzing may include creating one or more data structures which include information regarding the first plurality of nodes in the first graphical program and the second plurality of nodes in the second graphical program. Determining matches and differences may then include comparing the one or more data structures to determine the matches and differences. Thus, the one or more data structures may each comprise directed graphs comprising a plurality of vertices connected by edges, where each of said vertices represents one of the nodes in a respective one of the first and second graphical programs.

In some embodiments, the differences and/or matches may be determined in accordance with specified criteria or guidelines. In other words, analyzing the first and second information to determine differences and/or matches between the graphical programs may be performed in accordance with specified difference and/or match criteria, such as, for example, difference/match tolerance levels, category or type, cost, and performance, among others. For example, a tolerance criterion may specify that different versions of the same nodes or software programs are not to be considered different, i.e., are to be considered a match. In one approach, a difference or matching score may be computed, e.g., based on similarities or differences between the nodes, where exceeding a tolerance threshold may determine whether two nodes match. This threshold may be set to reflect a specified tolerance. Thus, in some embodiments, the user may specify a tolerance level or schema regarding matches and differences between nodes represented in the graphical programs.

As another example, category criteria may specify that only certain aspects of the graphical programs are to be considered, e.g., implementation code, associated hardware, deployment, or configuration information, among others. As an example of category criteria based on functionality, nodes or other objects with similar functionality may be considered a match, e.g., two different types of oscilloscope (virtual or real), data acquisition card, signal generator, etc. Cost criteria may specify cost-related aspects of nodes that may have bearing on the determined differences and/or matches. Similarly, performance criteria may specify what constitutes a differences and/or match based on functional performance of nodes, where performance may refer to any type of performance-related metric, such as, for example, speed, throughput, memory-size, and so forth. The criteria or guidelines may be stored on the host computer system or a device coupled to the host system over a network. In some embodiments, the criteria may be specified by the user. Thus, the method may include receiving user input specifying the difference and/or match criteria, e.g., via a graphical user interface (GUI).

As another example, the user may specify a particular view, e.g., software, associated hardware, GUI elements, and/or configuration information, to which the analysis may be directed. Thus, for example, if the user (or a default setting) specifies a software view, the analysis may only consider software nodes of the graphical programs. Similarly, if a hardware view is specified, the analysis may only consider hardware associated with the nodes of the graphical programs.

In some embodiments, the user may specify a tolerance for the determination of matches and differences between nodes, which may in turn determine whether two similar nodes in the two graphical programs should be considered a match or not. For example, the user may specify that in cases where two nodes (each from or represented in a respective graphical program) are identical but for configuration, the nodes are considered a match. However, in some embodiments, the analysis may determine various differences between the two original nodes, optionally in response to user input, e.g., by right-clicking on the node icon. As another example, the user may specify that the process not distinguish between software versions.

As mentioned above, in some embodiments, the analysis of the first and second information may include determining differences between the first and second graphical programs. In a preferred embodiment, the determined differences may correspond to or reflect any type of differences between the first and second graphical programs.

The determination of the differences between the first and second graphical programs may be performed in a variety of different manners. In some embodiments, the analyzing may include creating one or more data structures which include information regarding the first plurality of nodes in the first graphical program and the second plurality of nodes in the second graphical program, where determining differences includes comparing the one or more data structures to determine the differences. For example, as noted above, in one embodiment, the one or more data structures may each comprise directed graphs including a plurality of vertices connected by edges, where each of the vertices represents one of the nodes in a respective one of the first and second graphical programs. The directed graphs may then be analyzed to determine the differences. For example, in one embodiment, the graphical programs, or representations thereof, may be traversed or "walked", to enumerate their respectively nodes and connections. For example, if the graphical programs are represented by respective graphs, each graph may be traversed, where each node and connection (if any) is recorded. The resulting lists may then be compared to determine the differences.

It should be noted that in some embodiments, determining the differences between the graphical programs may also include determining differences between nodes in the corresponding graphical programs. For example, in some embodiments, differences between nodes comprised in the first and second graphical programs may include differences in one or more of: number and types of the nodes, in the case that some nodes are sub-VIs, sub-nodes of the sub-VIs, or configuration of the nodes, among others. For example, consider the case where the same type of node is represented in both graphical programs, but where one or more aspects of the node differ in the two graphical programs, e.g., versions, configuration data, deployment or target device, etc. The method may include determining all or part of these node differences.

For example, in some embodiments, during the analysis of the information regarding the graphical programs, e.g., during traversal of the graphical programs, each node or information representing or relating to each node, may be analyzed to determine any distinctions between otherwise similar or identical nodes. Note that as mentioned above, these "sub-node" differences may be between software, data, e.g., configuration data, and/or any other aspect of the respective nodes. Thus, for example, if the two graphical programs each includes a read node, the method may determine that the two read nodes include different configuration data, say, or target hardware. As yet another example, two nodes may be compared or "diffed" to determine differences in source code between the two nodes. Note that in various embodiments, differences between nodes included in the first and second graphical programs may include differences in one or more of: software versions, number and types of nodes, sub-VIs of the programs, source code of the nodes, deployment of the nodes, or configuration of the nodes, among others. These differences may apply to both the block diagrams and the user interface elements of the programs. In other words, both the block diagrams and the front panels (or other GUIs) of the graphical programs may be "diffed" (and merged).

Turning again to FIG. 8A, the determined differences (and thus, matches as well) are indicated via a dashed outline of the differing block diagram elements, specifically, the operator to the right of the loop, which, as discussed above, is a subtraction operator in the left block diagram, and a multiply operator in the right block diagram. Note that in this particular example, the dashed outline delineates the operator and the connections or wires coupled to the operator.

As FIG. 8A also shows, a dialog box is presented below the block diagrams indicating the number of differences found (1 Difference, "Block Diagram objects"), and the general type of difference found (1 Detail, "objects replaced/added/deleted"). As also shown, in this exemplary embodiment, user interface elements (e.g., buttons) are provided allowing the user to invoke such functionality as "Show Difference", "Clear", "Show Detail", and to specify that the determined difference(s) be circled. Additionally, as shown on the right side of the dialog box, in this embodiment, buttons are provided for further functionality, such as "Update", block diagram presentation options, such as "Tile Left and Right" and "Tile Up and Down", and "Help". Note that the options presented in this dialog are meant to be exemplary only and are not intended to limit the user specified difference options to any particular set of options. In other words, in other embodiments, any functionality may be included as desired.

A more detailed example of one embodiment of a difference technique is described below with reference to FIG. 6.

In 506, the first and second graphical programs may be merged based on the determined matches and differences, thereby generating a merged graphical program. For example, following the example above, the resulting lists may be analyzed and compared, e.g., removing redundancies between the two lists, and the merged graphical program generated based on the results. The merged graphical program may represent "merged" functionality, where, for example, or, alternatively, may comprise a union (in the set-theoretic sense) of the respective functionalities of the first and second graphical programs.

In another embodiment, the merged graphical program may be generated as the first and second graphical programs are traversed or walked, obviating the intermediate lists. For example, each graphical program may be traversed at least partially to determine a common node or resource, and then both graphical programs may be traversed starting with the common node in each. The method may then walk the respective graphical programs (or representations, e.g., graphs, data structures, etc.), adding and connecting nodes in a new graphical program (the merged graphical program) corresponding to those encountered in the traversals of the first and second graphical programs. Note that where the same nodes are encountered in the first and second graphical programs, only one corresponding node may be added to the merged graphical program, thereby avoiding redundancies in the merged graphical program.

In some embodiments, the information received in 502 above may comprise lists of nodes, as well as lists of connections between the nodes. The analysis may then include analyzing and merging the lists, then generating the merged graphical program based on the merged list. Of course, depending upon the type and form of the received information, any other type of comparison and analysis may be made as appropriate to generate the merged graphical program.

As mentioned above, in various embodiments, the user may specify various criteria, e.g., tolerance levels, priority, or schema regarding differences between components of the graphical programs, and a merged graphical program may be generated in accordance with the criteria.

Figure 8B:
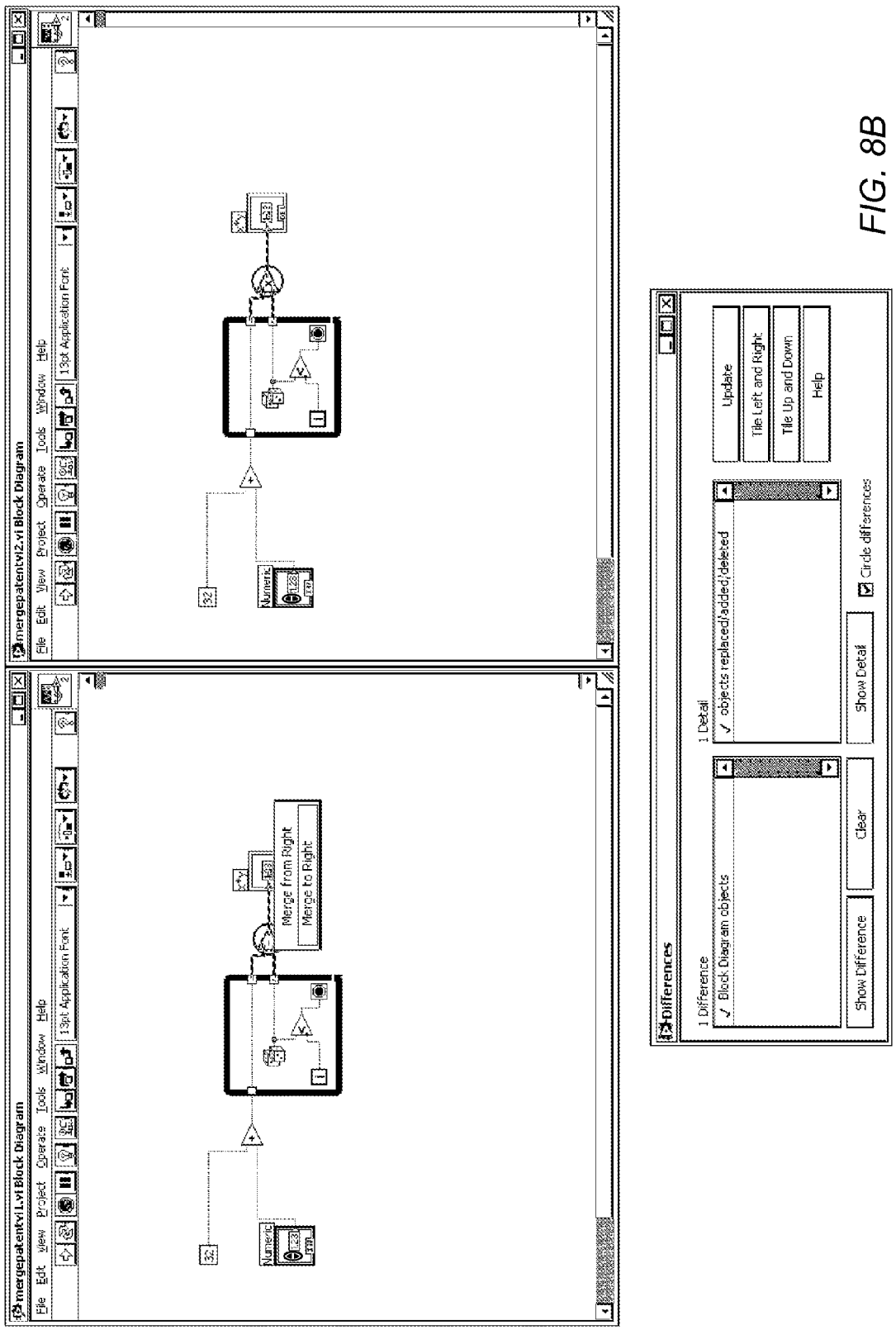
Figure 8C:
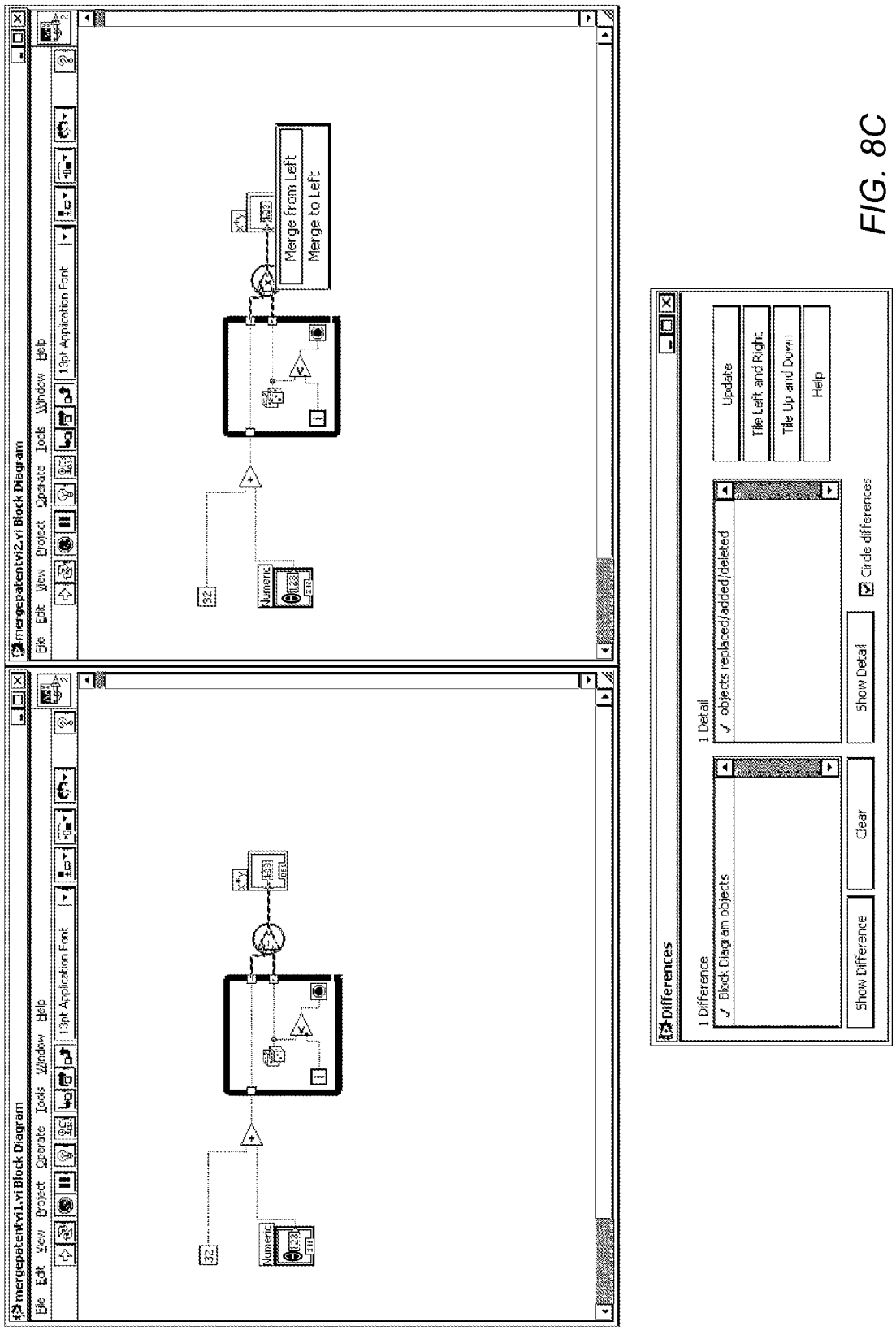

There are numerous ways to invoke and otherwise specify the merge operation. For example, FIG. 8B illustrates user selection of a "Merge to Right" option with respect to the left block diagram, which may operate to merge the left block diagram into the right block diagram, possibly replacing corresponding elements already present in the right block diagram. Similarly, FIG. 8C illustrates user selection of a "Merge from Left" option with respect to the right block diagram, which invokes the same functionality as that shown in FIG. 8B, but from the right block diagram. In other words, both FIG. 8B and FIG. 8C show invocation of a merge operation that merges the left block diagram into the right block diagram.

Figure 8D:
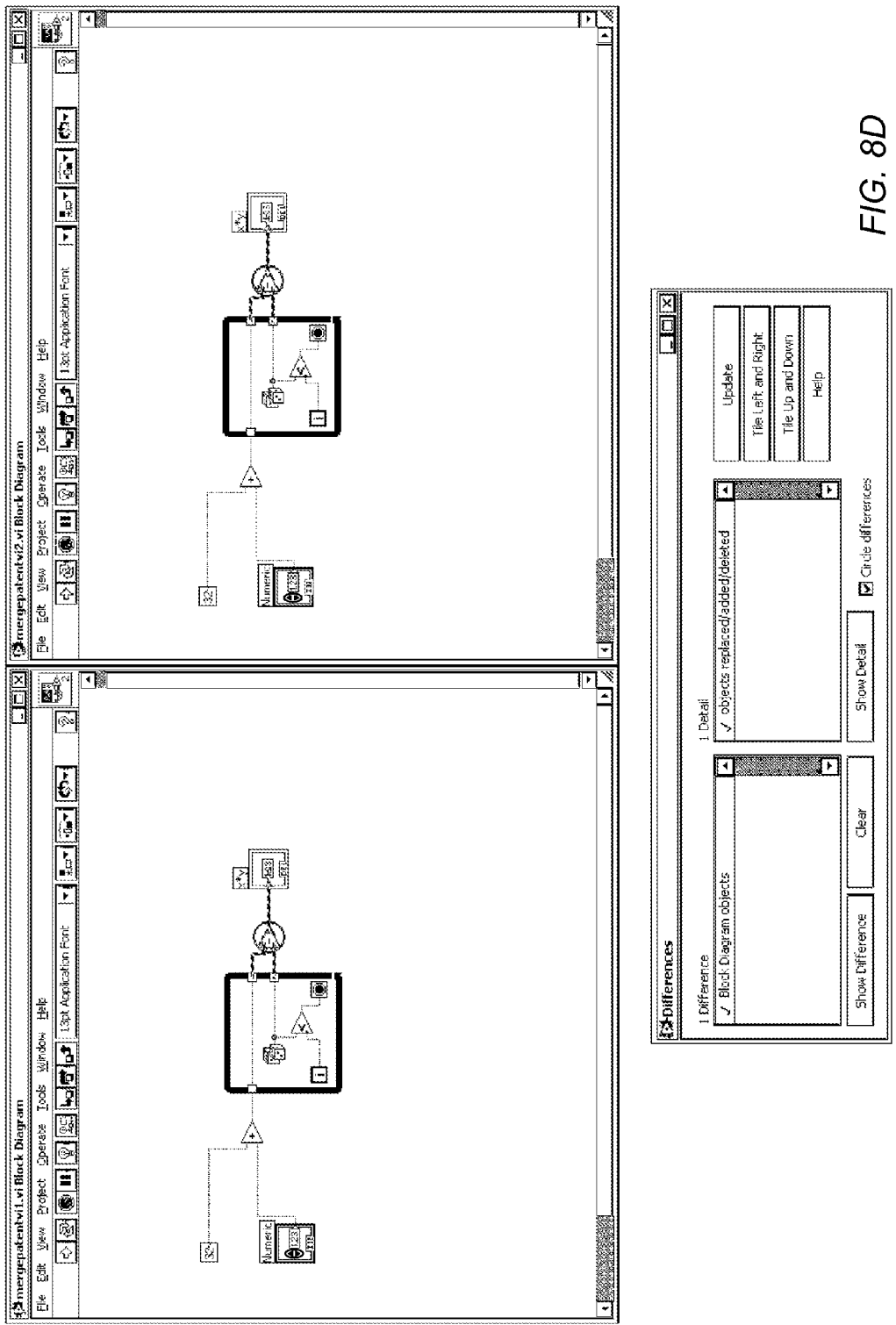
Figure 8E:
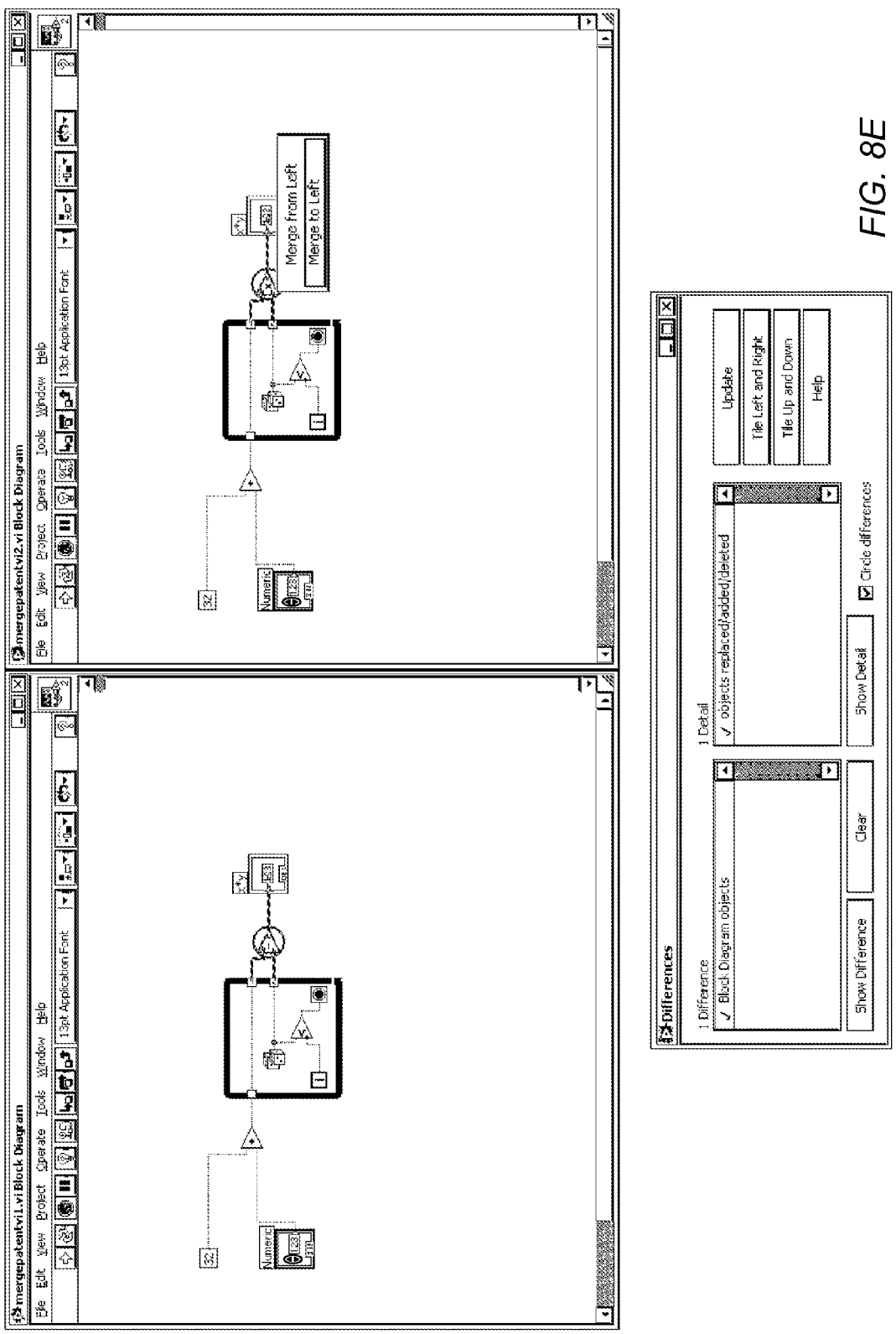
Figure 8F:
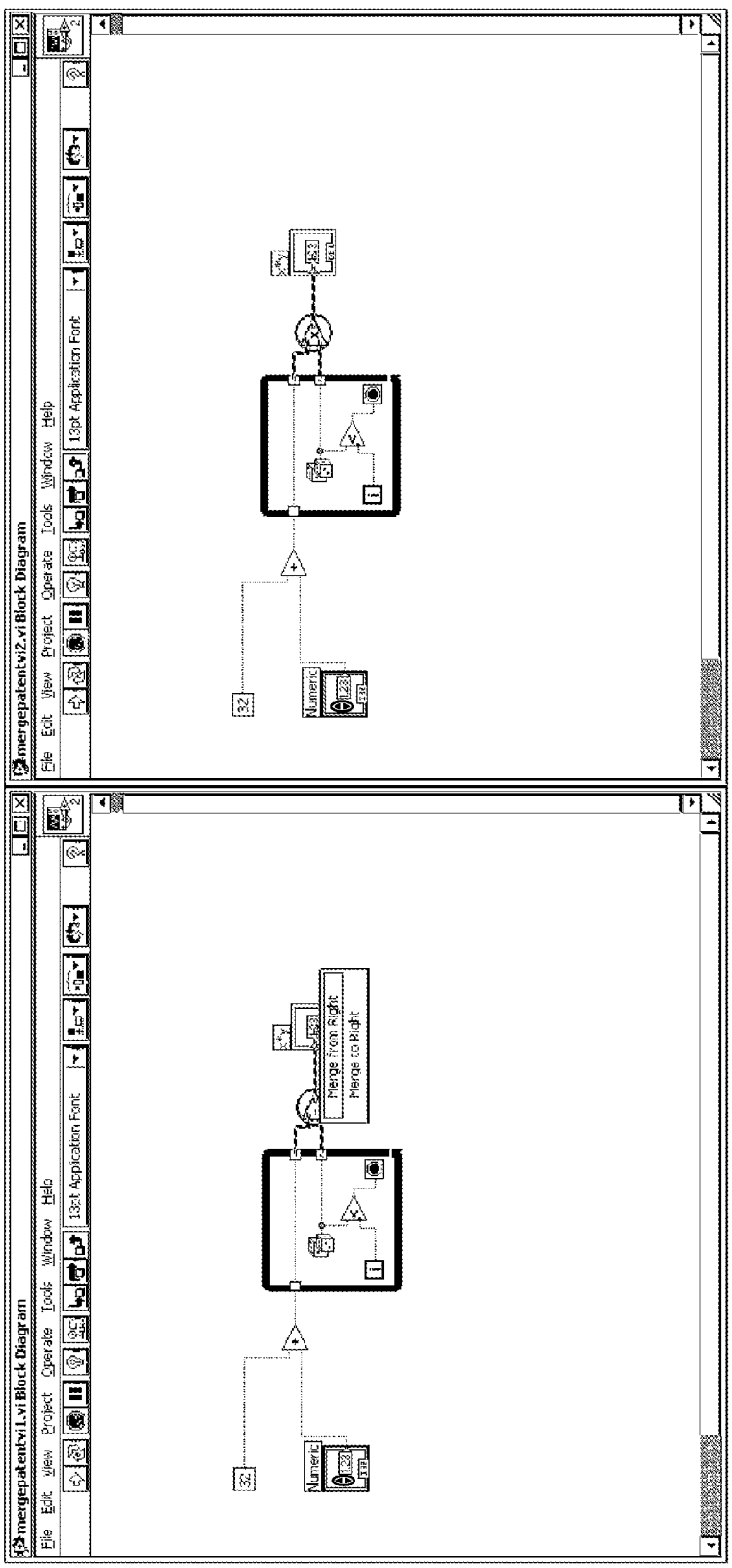
Figure 8F:
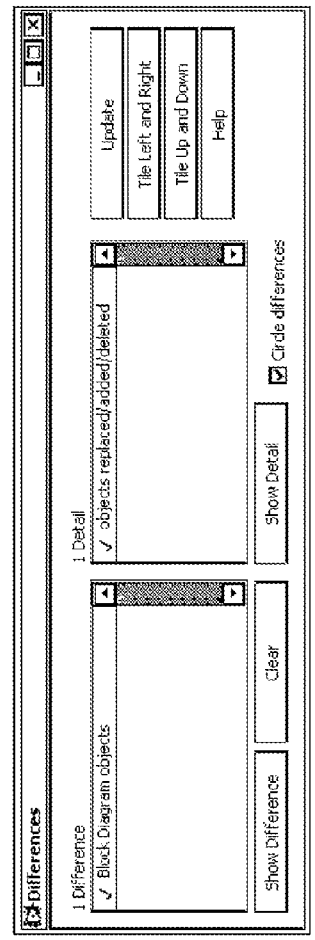

FIGS. 8E and 8F illustrate two respective invocations of a "right to left" merge operation, where, as shown, FIG. 8E illustrates invocation of a "Merge to Left" operation with respect to the right block diagram, and FIG. 8F illustrates invocation of a "Merge from Right" operation with respect to the left block diagram. As with FIGS. 8B and 8C, the merge operations of FIGS. 8E and 8F have the same effect.

Thus, in some embodiments, the merged graphical program may be generated by modifying the first or second graphical program, i.e., adding, deleting, and/or replacing, any "different" nodes and/or connections to the graphical program, where the affiliation of each of the nodes and/or connections may be indicated, e.g., the first or second graphical program. In some embodiments, a temporary third graphical program may be produced and used to update or modify the first or second graphical program.

Alternatively, the merged graphical program may be generated as a new graphical program. In some embodiments, the method may include receiving user input specifying the generation of the merged graphical program. For example, the user may specify that the first graphical program is to be modified to generate the merged program, or that the merged graphical program be separate and distinct from the first and second graphical programs.

As noted above, in some embodiments, details for listed differences between block diagram objects may be provided. For example, displaying the differences may also include displaying a text description of the differences. Additionally, in some embodiment, portions of the block diagram which are not part of the currently selected difference may be "grayed out" so that the difference may be visually highlighted for the user.

In one embodiment, the differences may be displayed in a distinguishing color. For example, a black rectangular background may be displayed behind the constant node in the first block diagram for a first period of time (such as two seconds), and then a black rectangular background may be displayed behind the constant node in the second block diagram for a similar period of time. This highlights the difference for the user so that the user can visually distinguish the difference.

In another embodiment, the differences may be surrounded with a dynamic dashed line, referred to as "marching ants", i.e., using visual movement of alternating colors, such as black and white, around a differing object in each of the graphical programs. In operation, the alternating black and white portions "move" visually around the nodes and along the wire to highlight the difference.

It should be noted that any of the display techniques described above (or others) may also be used in displaying such differences in the merged graphical program. For further information regarding "diffing" graphical programs, please see U.S. patent application Ser. No. 09/339,340 titled "System, Method and Memory Medium for Detecting Differences Between Graphical Programs," which was incorporated by reference above.

In one embodiment, undo and redo functionality for the diff/merge processes described above may be provided. For example, user interactions and responsive actions performed by the system and method described herein, collectively referred to as "actions", may be recorded, e.g., in a stack or other data structure, in the order performed, allowing the user to undo or retract actions in reverse order from that of their performance. This recorded sequence of actions may also be used to provide redo functionality, where actions or events undone by the undo functionality may be redone as desired.

Note that in various embodiments, the actions may be recorded as respective state information describing the state of the diffed/merged programs before and/or resulting from the action. For example, in one embodiment, each stored action may have an associated "diff" record, indicating the change of state of the diffed/merged programs corresponding to each action. In another embodiment, backup copies of the program(s), and/or auxiliary information, e.g., diff/merge configuration information, corresponding to each recorded action may be stored.

In yet another embodiment, the actions may be recorded as respective information whereby the system may access the functions that perform the actions and/or inverse functions for undoing the actions, e.g., function codes or pointers, and operands of the functions. Note that in various embodiments, the undo/redo functionality may apply to any actions of the diff/merge process as desired, including configuration steps, etc. The information stored for each recorded action may be referred to as diff/merge information. Further information regarding one embodiment of undo/redo functionality may be found in U.S. Pat. No. 5,990,906 titled "Undo Feature for a Graphical Programming System", which was incorporated by reference above.

Note that the examples presented herein are meant to be exemplary only, and are not intended to limit the contemplated differences discernable by the method to any particular type. A more detailed description of one embodiment of the merge process (method element 506) is provided below with reference to FIG. 7.

In 508, the generated merged graphical program may be displayed on a display device, e.g., a computer monitor, printer, etc. There are numerous ways in which the merged graphical program may be displayed, any of which may be used as desired. For example, in one embodiment, the merged graphical program may be displayed where nodes and/or connections common to both graphical programs, and/or those exclusive to each graphical program may be graphically displayed in such as way as to distinguish between them, e.g., via color, line-style, labels, enclosing borders, and so forth. In other words, a graphical program may be displayed that displays a set union or "merge" of the nodes and/or connections of the two graphical programs, where the nodes and/or connections are graphically displayed to indicate whether they are common to both graphical programs, and/or if not common, to which system they belong, e.g., by highlighting, color, outline, style, labels, etc. In other words, nodes and/or connections common to both graphical programs, and/or those exclusive to each graphical program may be graphically displayed in such as way as to distinguish between them. Thus, in some embodiments, the graphical programs may be merged to generate a merged graphical program, and the results displayed.

In some embodiments, the merged graphical program may be indicated textually, e.g., as lists or tables of nodes and optionally, their connectivity. For example, names of nodes (and optionally, connectivity) may be grouped according to their graphical program affiliation, including a "common" group comprising those common to both graphical programs.

FIG. 8D illustrates the result of either of the two (left to right) merge operations of FIGS. 8B and 8C, where, as may be seen, the multiply operator of the right block diagram has been replaced with the subtraction operator of the left block diagram.

Figure 8G:
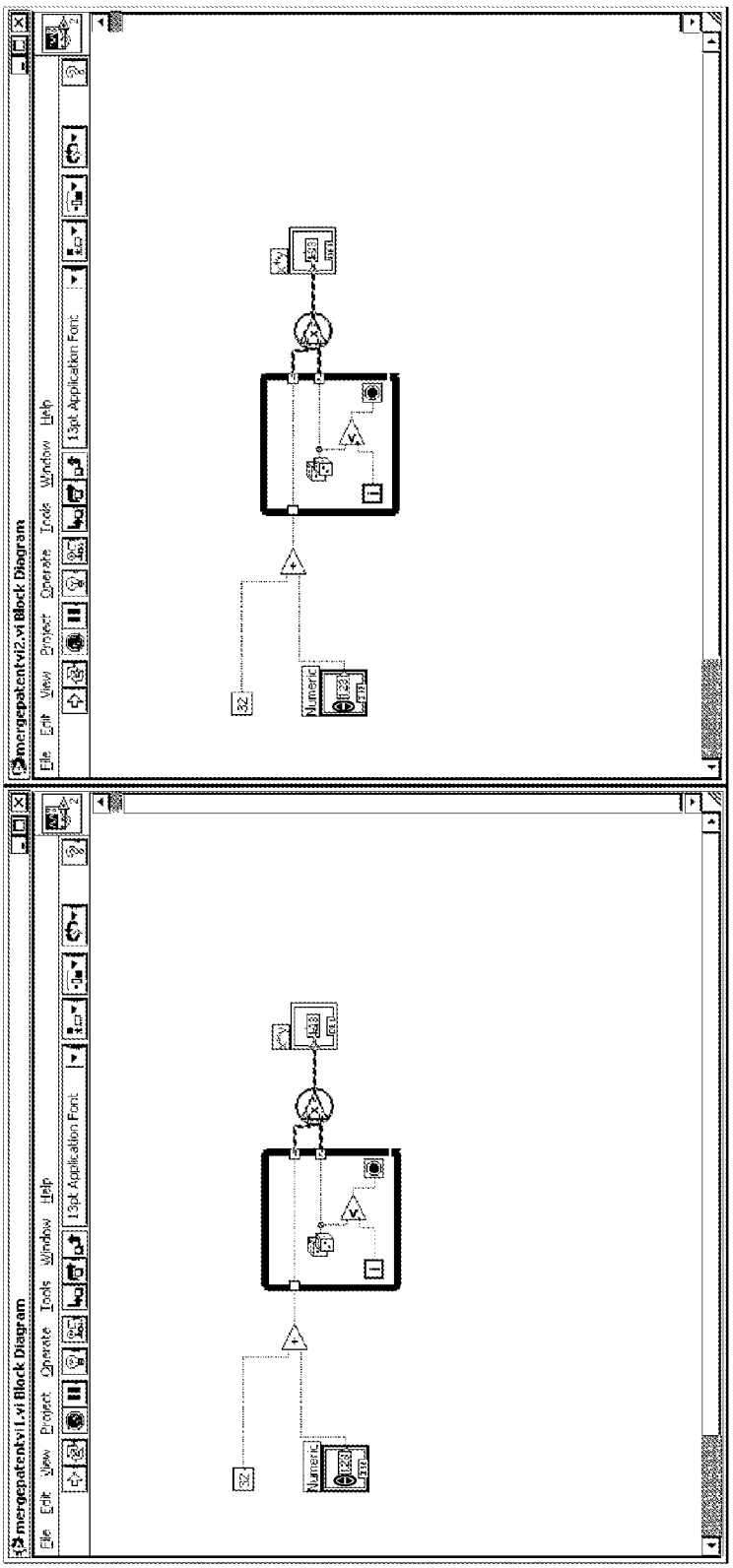
Figure 8G:
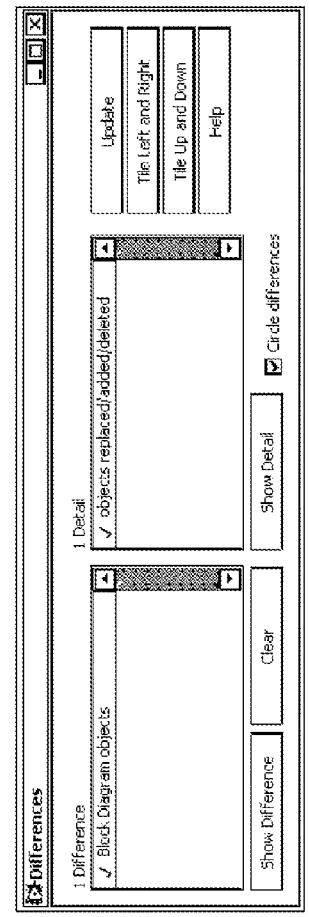

FIG. 8G illustrates the result of either of the two (right to left) merge operations of FIGS. 8E and 8F, where, as may be seen, the multiply operator of the right block diagram has replaced the subtraction operator of the left block diagram.

Any other means of displaying the merged graphical program are also contemplated, including, for example, combinations of textual and graphical representations. For example, displaying the merged graphical program may also include graphically indicating the matches and differences between the first and second graphical programs in the merged graphical program, and/or displaying a textual description of matches and differences between the first and second graphical programs. In one embodiment, graphically indicating the matches and differences between the first and second graphical programs in the merged graphical program may include highlighting the differences between the first and second graphical programs in the merged graphical program.

Thus, in various embodiments, displaying the merged graphical program on a display device may include one or more of: displaying a textual description of each of the matches and differences, or displaying a merged graphical program comprising a union of the first and second graphical programs and highlighting the differences (and/or matches) between the first and second graphical programs. An example of a merged graphical program according to one embodiment is described below.

The merged graphical program may be used for any of a variety of purposes. For example, in one embodiment, the first graphical program may comprise a desired program specification or functionality, and the second graphical program may comprise a program that the user may wish to modify to bring in accordance with the specification. In some embodiments, the determined differences and/or matches between the two programs, and represented in the merged graphical program, may be used to place an order for any components, e.g., graphical program nodes or elements, needed to bring the second graphical program into accordance with the specification, i.e., the first graphical program, and/or to acquire missing components directly, e.g., via downloading from a server system. Thus, in some embodiments, the method of FIG. 5 may further include providing means for enabling the user to acquire needed but missing components for the second graphical program.

For example, in one embodiment, software executing on a client computer system, e.g. the users computer system, and/or software executing on a server computer, e.g. coupled to the client computer, may analyze the determined differences and may automatically initiate acquisition and/or purchase of the missing (one or more) components. In one embodiment, the software may automatically order the components without user input, e.g., via the network (e.g., the Internet), for example, if the user's billing or payment information (e.g., credit card number, credit account number, etc.) is already stored or available to the software. In other words, the system may comprise an e-commerce system that automatically orders and purchases the needed components based on the determined differences. In other embodiments, the user may be presented with a GUI, e.g., displayed on the client system and provided by the server and/or the client system, prompting the user for input regarding completion of the second graphical program. For example, the GUI may display the merged graphical program, e.g., highlighting those components that are missing in the second graphical program, and may prompt the user with a "Complete the graphical program?" message or equivalent. In response to a positive answer from the user, a search for and/or order of the missing components may then be performed. For example, one or more quotes for each missing component may be presented to the user, including, for example, cost, vendor, delivery times, and/or any other information useful for making a purchase decision, where the quotes may be retrieved from a database, via a network search engine, or any other source of quote information. As another example, the user may click on each of the missing components in the diagram, thereby invoking respective options related to that component, such as, for example, searching for similar components, ordering the component, etc. The GUI may also facilitate user entry or specification of payment information for acquiring the components. Note that in some cases, one or more of the needed components may be free, e.g., software components available for download from a server, etc. Note that in embodiments where the determined differences and matches include hardware associated with the graphical programs, the components searched for and quoted (and optionally ordered or otherwise acquired) may include hardware components.

Where multiple versions of a component are available, selection or priority criteria, possibly specified by the user, may be used to select among the possible components. The selection criteria may specify desirable attributes such as cost, performance, manufacturer/vendor, delivery time and/or means, and so forth, which may guide in the selection of the components.

In other embodiments, at least some user input may be required to acquire the components. For example, in one embodiment, the client computer system may contact a server computer system to acquire the desired components. In one embodiment, a GUI may be presented to the user on a display device of the client computer system (e.g., possibly the GUI of 506 and/or 508 above), where the GUI may be provided by the client computer system and/or by the server. In one embodiment, the user may specify which components are needed, although in other embodiments, the GUI may indicate to the user which components (or component types) are needed by the second graphical program to bring it into compliance with the specification, i.e., the first graphical program.

Thus, the GUI may present user-selectable options for acquiring the missing graphical program components or elements. As one example, the GUI may simply provide a list of the needed components (possibly numerous versions of each) and contact information for sources or vendors of the components, e.g., names, addresses, telephone numbers, websites or URLs, and so forth. As another example, the GUI may present various ordering options and/or means for acquiring the components, including, for example, user-selectable links for placing orders over a network, e.g., the Internet, or for downloading software (including, for example, hardware configuration programs for programmable hardware elements) and/or data, e.g., configuration data. In some embodiments, the GUI may present information to help the user select components, such as, for example, cost, vendor, manufacturer, technical specifications, order fulfillment times, and so forth. The GUI may also facilitate user entry of payment, billing, or account information needed to purchase the components, as mentioned above.

In some embodiments, the method (e.g., the server) may automatically determine possible sources for candidate components by accessing an internal or external database, or by searching a network, e.g., the Internet, where, as noted above, specified selection or priority criteria may be used to guide the search.

It should be noted that in some embodiments, the search may not be performed solely on the basis of each required individual component. For example, a subset of a system may be represented by a graph structure, and successive, expanding, subsets of the system may be queried for in the database(s). This user may thus be able to purchase a subsystem based on the ability of a vendor to have available a connected subset of a system.

The user may purchase the different components from different vendors. As noted above, some of the components may be available for free or download via a network connection. For example, the user may require driver software and may be able to freely download it and update his graphical program. In some cases, the user may have on hand some of the newly identified missing components, and so may mark these components for exclusion in the search operation to obtain a quotation.

In one embodiment, if the search is unable to find an exact match, a vendor (e.g., software operating on a vendor server and/or a human operator, may determine that a modified version of the desired component or subsystem may be created for the user, and may present this modified solution for consideration by the user. The vendor may set thresholds for matching in order to be notified when such requests are made. The vendor may be able to manually respond to the request by the user in this case where a database query alone may not have resulted in provision of a valid quotation to the user.

The user may be prompted to approve or initiate a suggested order or purchase, or to select from candidate components, after which the order may be placed, and the component delivered for inclusion in the second graphical program. For example, in one embodiment, the server (or another external server system) may download the component directly to the client computer system, from which the component may be deployed to the second graphical program. As another example, if the second graphical program (which may reside on the client computer system) is networked to the server, the server may automatically download and deploy the component to the second graphical program. In another embodiment, the server (or another system) may download the component to the client computer system, and the client computer system may automatically deploy the component to the second graphical program, e.g., possibly using installation software downloaded with the component.

Thus, the system may be operable to determine missing components, order and purchase the components, and deploy the components to the second graphical program, e.g., in order to bring the second graphical program into compliance with the first graphical program. Thus, one or more of the missing components may be acquired, e.g., via download from the server (or a different server) and/or via more physical means, such as delivery via any of various delivery or postal means.

Merged Graphical Programs

As noted above, in some embodiments, the merged graphical program graphically represents differences and/or matches between the graphical programs, and, depending upon the particular specification of the merge process, e.g., which portions or views of the graphical programs are merged, may comprise a union of the elements of the two graphical programs.

For example, consider a first graphical program with nodes A-F, and a second graphical program with nodes C-H, and assume that the merge process has been specified to apply to the two programs in their entirety. The resulting merged graphical program preferably includes nodes A-H, where the overlapping nodes, C-F, are not duplicated. Thus, for example, although node C appears (once) in each of the first and second graphical programs, only one node C is present in the merged graphical program.

Similarly, assume that the first graphical program includes connections AC, BC, CD, DE, EF, among the nodes A-F, and the second graphical program includes connections CD, DE, EF, EG, and GH among the nodes C-H. The resulting merged graphical program preferably includes nodes A-H, as described above, and also includes connections AC, BC, CD, DE, EF, EG, and GH among these nodes. Thus, the merged graphical program of this example includes the union of the nodes and the connections of the first and second graphical programs.

As also noted above, the merged graphical program preferably denotes graphically whether the respective nodes and connections are from the first graphical program, the second graphical program or both. Thus, in one embodiment, nodes A and B, and connections AB and BC may be denoted (e.g., by color, line-style, borders, etc., as described above) as originating in the first graphical program. Similarly, nodes G and H, and connections EG and GH may be denoted as originating in the second graphical program. Finally, nodes C, D, E, and F, and connections CD, DE, and EF may be denoted as being common to both the first and second graphical programs.

Thus, a user may quickly ascertain from the merged graphical program where the two graphical programs differ, and conversely, where they match. This information may then be used for any of a variety of purposes, as described above. For example, the user may analyze the merged graphical program and may then decide whether the differences require modification of one or both of the graphical programs. Of course, as described above, in other embodiments, the differences (and/or matches) may be indicated in any of a variety of ways, including, for example, using graphical indications such as highlighting, color, outline, style, labels, and so forth, or textual means, such as tables, lists, descriptions, etc., as desired.

In other embodiments, the merge process may be performed in such a way that some differences are merged to one graphical program, e.g., the first graphical program, and other differences are merged to another, e.g., the second graphical program. In other words, rather than generating a single merged graphical program comprising a union of the original graphical program elements, the user may, on a per difference basis, direct various merge results to each graphical program (or to two new graphical programs, if the original graphical programs are to be preserved). For example, this approach may be useful in cases where multiple versions of a program are maintained and extended in parallel, and where some of the features produced in each development process may be desired in the other.

Thus, in various embodiments, the merge process applied to first and second graphical programs may generate a third (new) graphical program, may modify one or both of the first and second graphical programs, and/or may generate two new graphical programs, each comprising a modified (i.e., at least partially merged) version of one of the original graphical programs.

FIG. 6—High-level Diff Flowchart

Referring now to FIG. 6, a flowchart illustrating a method of detecting differences between graphical programs according to some embodiments is shown. More specifically, FIG. 6 is a more detailed flowchart of method element 504 of FIG. 5, according to one embodiment, although other differencing methods may be used as desired. Preferably, the method of the present invention is embodied as a software program that executes on a computer system such as computer system 82 of FIG. 1. The software program of the present invention for detecting differences between graphical programs will subsequently be referred to as "diff" for brevity. It should be noted that in different embodiments, various of the method elements described below may be performed concurrently, in a different order than shown, or may be omitted. Additional method elements may also be performed as desired.

In the preferred embodiment, the graphical programs use graphical data flow programming, such as the LabVIEW graphical programming environment. However, other graphical programming systems may employ the method described herein to detect differences between graphical programs. Examples of systems which may employ the method are Visual Designer from Intelligent Instrumentation, Hewlett-Packard's VEE (Visual Engineering Environment), Snap-Master by HEM Data Corporation, DASYLab by DasyTec, and GFS DiaDem, among others. Programming environments which include graphical programming elements can also use the graphical diff method of the present invention.

In 600, the method (i.e., diff) receives as input two graphical programs (or information regarding the two graphical programs), such as the graphical program of FIG. 4. Each of the graphical programs includes a plurality of objects. An object may be defined as having attributes, or properties, and methods according to the notion of objects in the art of object oriented programming. Preferably, an object has an associated icon that visually represents the object, as shown in FIG. 4. Preferably, the graphical program comprises a block diagram portion and a user interface panel portion, and the objects are arranged in these two portions: the block diagram portion and the user interface panel portion. Alternatively, the objects are comprised solely in a block diagram or graphical program portion. In this embodiment, user interface objects, if present, may be comprised in the block diagram portion. A user interface panel is shown in the window in the upper right hand portion of FIG. 4 and a block diagram is shown in the window in the lower left hand portion of FIG. 4. In the case of instrumentation control applications, the user interface panel is typically referred to as an instrument front panel, or front panel. The objects in the user interface panel include controls and indicators. Controls are used to receive input, typically from a user, and to provide the input data to the block diagram. Indicators are used to receive output data from the block diagram and display the output data to the user. Examples of indicators are graphs, thermometers, meters and gauges. Examples of controls are slides, knobs, switches, buttons and dials. In one embodiment, the controls and indicators include clusters of controls and indicators arranged in a hierarchical manner.

Preferably, the user interface panel comprises a directed acyclic graph of objects. In particular, the user interface panel comprises a hierarchical tree structure wherein the nodes of the tree are the user interface panel objects. A graph may be defined as a finite non-empty set of vertices and a set of edges such that every edge connects exactly two vertices. Preferably, any two vertices may be connected by zero or more edges. In the user interface panel, the vertices are the control and indicator objects and the edges are the hierarchical relationship between the objects. The direction of the edges are determined by the level in the hierarchy. That is, the direction is from higher level objects to lower level objects. The connectivity of an object is related to the other objects to which it is connected, i.e., its neighboring objects, and the edges by which it is connected to its neighboring objects.

The block diagram is the portion of the graphical program which includes the graphical code to perform the calculations and operations of the graphical program application. The objects in the block diagram include terminals associated with the front panel controls and indicators. The front panel terminals are used to input and output data between the front panel controls/indicators and the function blocks of the block diagram. The block diagram objects also include function nodes, such as mathematical operators; code execution structures such as for loops, while loops, case statements, and variable references; string functions; file I/O nodes; communication nodes; instrument I/O nodes; and data acquisition nodes, for example. Preferably, the block diagram nodes are connected by data paths, or signals, which determine the flow of data through the block diagram.

In the preferred embodiment, the block diagram comprises a data flow diagram arranged as a directed acyclic graph. The vertices of the graph are the terminals and nodes of the block diagram. The edges of the graph are data path signals which connect the nodes and terminals. The nodes themselves comprise one or more terminals which are connected to the edges. The direction of the edges of the graph is determined by the nodes themselves. For example, if a signal is connected between an output terminal of a first node and an input terminal of a second node, then the direction of data flow on that edge is from the output terminal to the input terminal.

As indicated in 602, in response to receiving the two graphical programs, diff may create a data structure representing the first block diagram, a data structure representing the second block diagram, a data structure representing the first user interface panel, and a data structure representing the second user interface panel. Preferably, the data structures comprise directed graphs, and more particularly, directed acyclic graphs. The graphs are used by diff to determine differences between the block diagrams and user interface panels of the two graphical programs. Method element 602 and the graph structure is discussed in more detail in U.S. Pat. No. 5,974,254, which was incorporated by reference above.

In 604, diff may then match objects in the first graphical program with objects in the second graphical program. Objects are matched according to one or more criteria, such as object type, connectivity, attributes and position. Preferably, the matching is performed by calculating a weighted score which indicates a degree of matching or similarity between an object in the first graphical program and an object in the second graphical program according to the one or more criteria to produce matching information. The matching information is used to group the objects into matching subgroups, or sub-graphs, and non-matching sub-graphs for the purpose of determining differences between the two graphical programs. The matching of objects performed in method element 604 is described in more detail in U.S. Pat. No. 5,974,254, which was incorporated by reference above.

Diff may then determine differences between the first graphical program and the second graphical program, as shown in method elements 606, 608 and 610. Differences are determined for the block diagrams, the user interface panels and/or the attributes of the first and second graphical programs. The determining of differences may include comparing objects found to match in method element 604 to determine any differences between the matching objects. The determining of differences may also include determining objects in the first graphical program which have no match, i.e., which do not exist in the second graphical program. The differences may be functional differences or cosmetic differences. A functional difference is one that may potentially affect the execution of the graphical program. Cosmetic differences are differences that do not affect execution of the graphical program. If the same set of inputs to a graphical program produce the same set of outputs even though a change has been made, that difference is a cosmetic difference rather than a functional difference. The determining of differences in the block diagrams and user interface panels performed in method elements 606 and 608, respectively, is described in more detail in U.S. Pat. No. 5,974,254, which was incorporated by reference above.

Preferably, the graphical program also includes attributes. Examples of graphical program attributes include an icon and connector representing the virtual instrument; attributes related to execution of the graphical program, such as execution priority and whether or not to run the graphical program upon being loaded; attributes related to the visual presentation of the graphical program, such as whether or not to display toolbars and window scroll bars; documentation-related attributes; attributes relating the history of the graphical program; and selection of a run-time menu. Diff detects differences between the attributes of the two graphical programs, as indicated in method element 610.

Figure 9A:
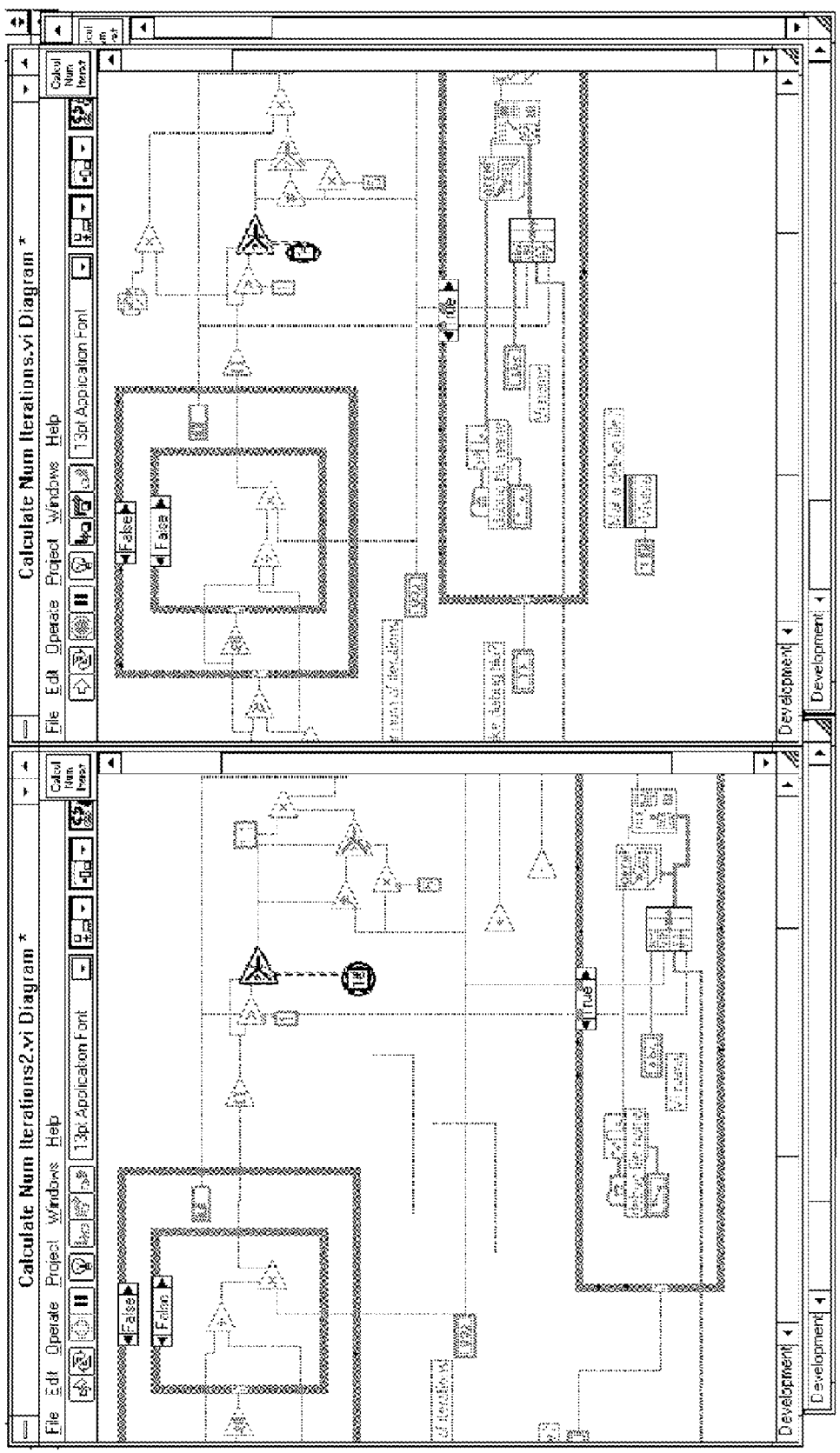
FIGS. 9A and 9B are exemplary screenshots of differencing results, according to one embodiment.

In 612, once diff determines the differences between the two graphical programs, diff may display an indication of the differences on the display screen of the computer system 82. In one embodiment, diff highlights differences by drawing a geometric symbol, such as an ellipse or circle, around the differences, as shown in FIG. 9A. FIG. 9A shows two versions of a virtual instrument named "Calculate Num Iterations" and "Calculate Num Iterations2". The block diagrams of the two graphical programs are displayed side by side in FIG. 9A. One of the differences between the two graphical programs is shown in FIG. 9A. The difference is related to a constant node which is connected as an input to a Select node. The block diagram on the left has a constant node with a value attribute of 10, whereas, the block diagram on the right has a constant node with a value attribute of 1. FIG. 9A shows the constant node in each block diagram with an ellipse drawn around them to highlight the difference. It is noted that the portions of the block diagram which are not part of the currently selected difference are "grayed out" so that the difference may be visually highlighted for the user.

In operation of one embodiment, diff also displays the differences in a distinguishing color. For example, a black rectangular background is displayed behind the constant node in the first block diagram for a first period of time (such as two seconds), and then a black rectangular background is displayed behind the constant node in the second block diagram for a similar period of time. This highlights the difference for the user so that the user can visually distinguish the difference.

In operation of another embodiment, diff surrounds the differences with "marching ants". Marching ants refers to the visual movement of alternating colors, such as black and white, around a differing object in each of the graphical programs. This operation may be partially seen in FIG. 9A by virtue of the fact that the constant node and the Select node are circumscribed with an alternating black and white portion thick line. Likewise, the wire connecting the two nodes is highlighted in a similar manner. In operation, the alternating black and white portions "move" visually around the nodes and along the wire to highlight the difference.

Figure 9B:
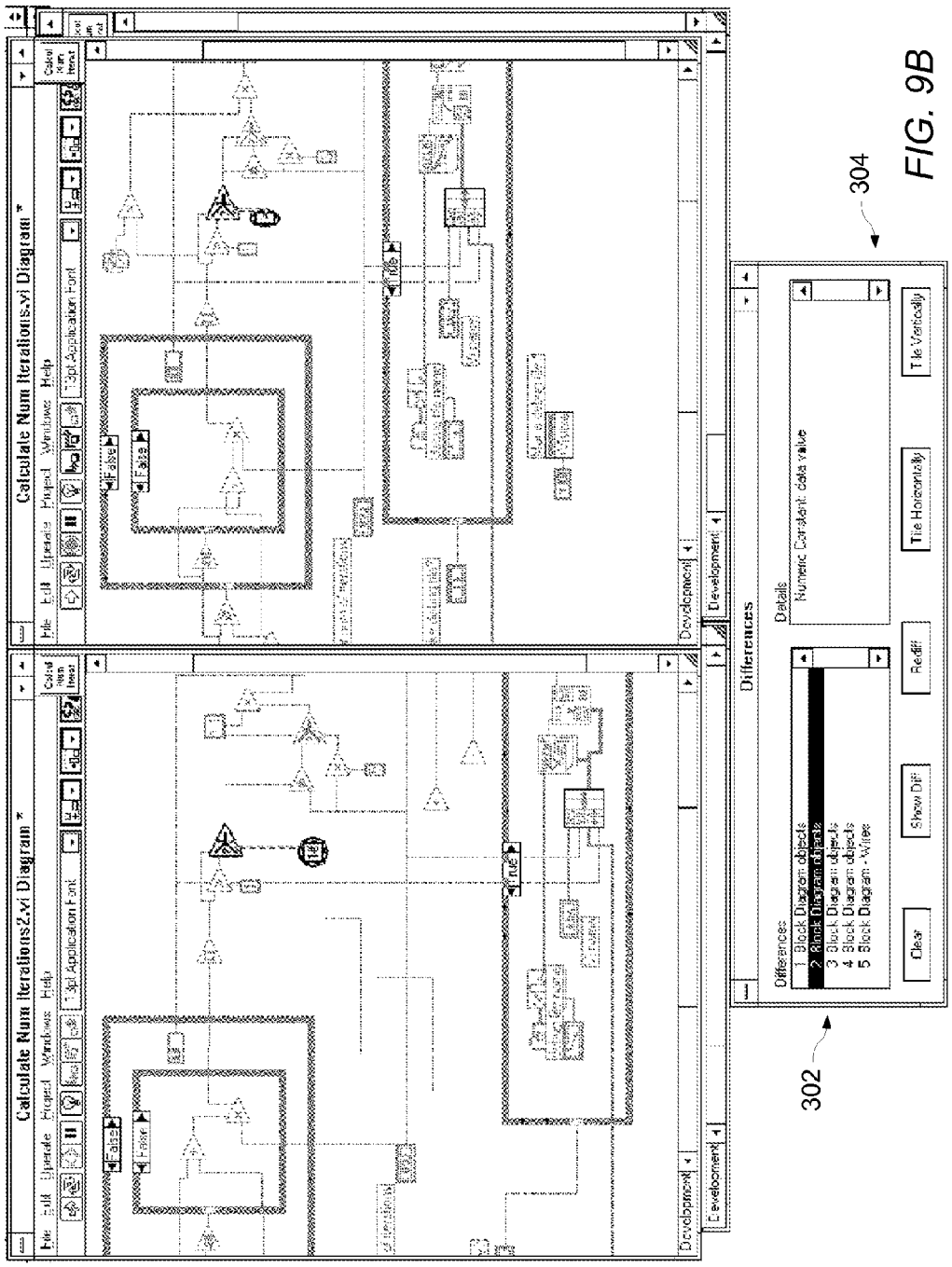

As noted above, displaying the differences may also include displaying a text description of the differences. For example, FIG. 9B shows a "Differences" window at the bottom portion of the screen. The left portion 302 of the Differences window lists five differences between the two block diagrams shown. The right portion 304 of the Differences window provides a more detailed textual description of the difference highlighted in the left portion and which is currently displayed in the block diagrams, namely, a numeric constant data value. In FIG. 9B, the text description reads "Numeric Constant: data value" to indicate that there is a difference between the value of 10 and the value of 1 in the two constant nodes highlighted.

Preferably, differences may be determined in the block diagram, front panel and/or graphical program attributes individually or in any combination thereof, rather than determining the differences in all three.

It should be noted that the "diff" process described above with reference to FIG. 6 is meant to be exemplary only, and is not intended to limit the present invention to any particular difference algorithm, functionality, or appearance.

Figure 7:
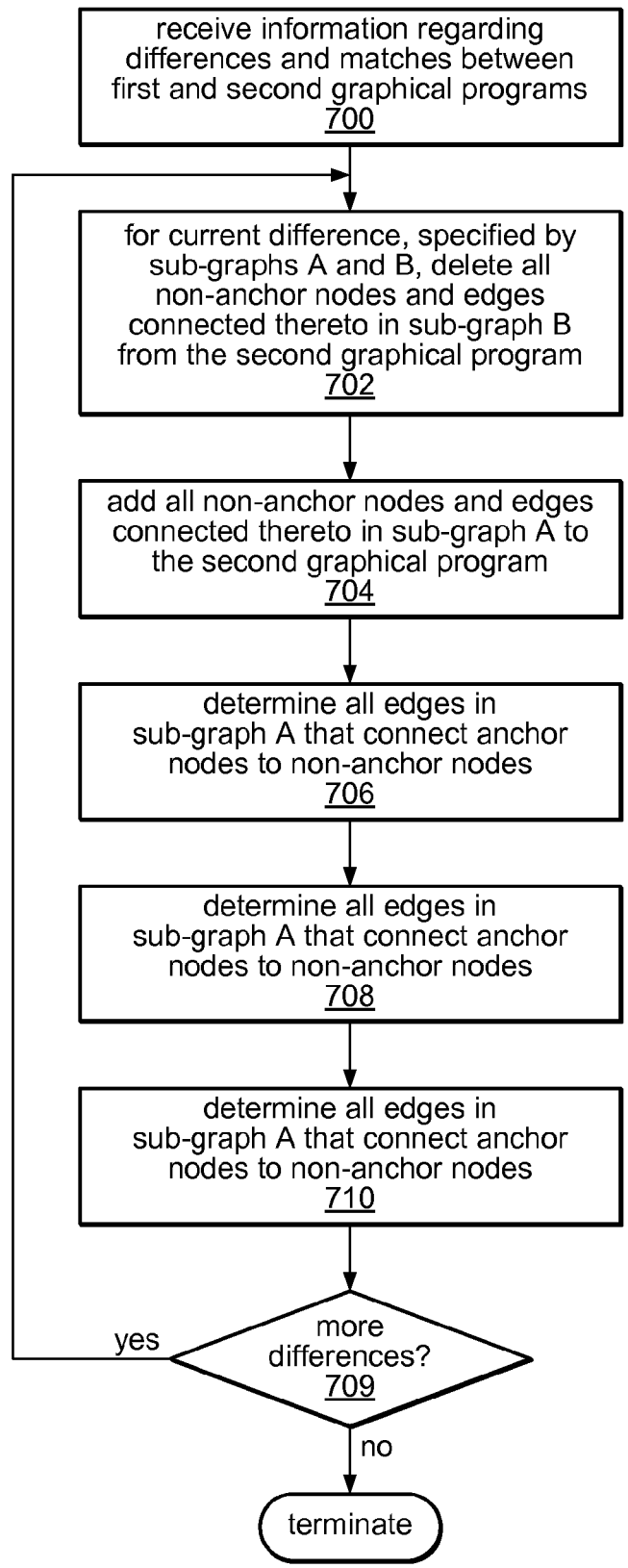
FIG. 7 is a flowchart diagram illustrating one embodiment of the merge process of the method of FIG. 5.

FIG. 7—The Merge Process

FIG. 7 is a more detailed flowchart of method element 506 of FIG. 5, according to one embodiment. As noted above, in various embodiments, some of the method elements shown may be performed concurrently, in a different order than shown, or may be omitted. Additional method elements may also be performed as desired.

In the embodiment described below, it is assumed that a diff operation has already been performed on two graphical programs, e.g., first and second graphical programs, such as those described above with reference to FIG. 6. More specifically, in the embodiment described below, each graphical program is referred to as or represented by a respective graph, and each determined difference is represented by a respective pair of sub-graphs (e.g., graphical sub-programs), e.g., a first sub-graph, referred to below as sub-graph A, including one or more nodes and zero or more edges in the first graph (i.e., the first graphical program), and a respective second sub-graph, referred to below as sub-graph B, comprising one or more nodes and zero or more edges in the second graph (i.e., the second graphical program).

In other words, each difference between the two graphical programs may include or be represented by a respective sub-graph A in the first graphical program and a respective sub-graph B in the second graphical program, where sub-graphs A and B are different. Sub-graphs A and B may comprise or represent corresponding differences between the first and second graphical program, and may be determined based on anchor elements, e.g., anchor nodes, where anchor nodes are program nodes in the first graphical program that have an exact match in the second graphical program (or vice versa), e.g., as determined by the matching algorithm or heuristic used by the graphical differencing system. Note that the techniques described herein are broadly applicable to other program elements, as well, e.g., information or code associated with nodes, connections, or any other aspects of the program. Thus, depending on the difference/match criteria, embodiments of the approach described may utilize other types of anchor elements than nodes, or, considered another way, the graph nodes may represent other aspects of the graphical program instead of graphical program nodes.

Thus, in preferred embodiments, the graphical differencing described above preferably produces a collection of one or more graphical differences, e.g., a collection of sub-graph A/B pairs. The method embodiment described below is specifically directed to merging the difference in sub-graph A from the first graphical program into sub-graph B from the second graphical program, although it should be noted that the same process can be used to merge sub-graph B into sub-graph A. Thus, in one embodiment, the final merged graphical program may thus include all the merged sub-graphs, in addition to the anchor nodes. Of course, as noted above, in other embodiments, two merged graphical programs may be generated that collectively include all the merged sub-graphs, but which may differ as to which graphical program includes which merged sub-graphs. Note that while the operations described herein refer to the first and second programs, it should be noted that if the original graphical programs are to be preserved, the operations may be performed on copies of the graphical programs. As shown, this method may operate as follows:

In 700, information regarding differences and matches between first and second graphical programs may be received, e.g., from a graphical differencing process, such as that described above with reference to FIG. 6. While in various embodiments, this information describing or specifying the differences may take any of a variety of forms, in preferred embodiments, the information comprises a set of sub-graphs (or a specification or description thereof), where, as described above, each difference between the two graphical programs has or is described by an associated pair of sub-graphs, A and B. Note that in some cases, e.g., when one graphical program has an element that is omitted from the other, one of the sub-graphs may be empty, i.e., may be a null sub-graph. Once the information regarding the matches and differences is received, the method may process or analyze each difference, as described below.

In 702, for a current difference, all non-anchor nodes in sub-graph B and edges connected to these nodes may be deleted from the second graphical program.

In 704, all non-anchor nodes from sub-graph A and edges connected to these nodes may be added to the second graphical program.

In various embodiments, program elements, e.g., nodes and edges (wires) may be added to the graphical program in different ways. For example, due to the graphical nature of the programs, space (e.g., in the block diagram) may need to be provided for the added elements. In one approach, bounds circumscribing the program elements, e.g., bounding boxes, convex hulls, or functional equivalents thereof, may be determined, where the bounds define a space wherein the elements may be placed, e.g., in a graphical program. In one embodiment, the bounds may comprise rectangles, although other shapes may be used as desired, e.g., convex hulls or variants thereof, closed curves, aggregations of rectangles and/or other shapes, and so forth.

Thus, in one embodiment, a bounding rectangle for all non-anchor nodes in sub-graph A may be determined. The resulting rectangle may be referred to as R1. Similarly, a bounding rectangle for all non-anchor nodes in sub-graph B may be determined, where the resulting rectangle may be referred to as R2. A third rectangle, referred to as R3, may be determined based on the differences between R2 and R3.

For example, if the area of R1 is greater than R2, space in the second graphical program may be created (or added) by increasing the coordinates (x,y) of all objects (e.g., program elements) to the right and below R2 by the respective differences in width and height of R1 and R2.

If the area of R1 is less than R2, then space in the second graphical program may be reduced by decreasing the coordinates (x,y) of all objects to the right and below R2 by the respective differences in width and height of R1 and R2.

In other words, an offset (increase or reduction) may be determined that reflects the difference in size of R1 and R2. The modified (increased or reduced) space corresponds to R3. Thus, the new rectangle R3 may be determined by modifying the width and height of R1 by the determined offset (size difference) of R2. In some embodiments, the non-anchor nodes of 704 may thus be placed into R3 with their relative positions preserved, where R3 represents or specifies the "insertion space" for the merged sub-graph in the second graphical program.

In 706, all edges in sub-graph A that connect anchor nodes to non-anchor nodes may be enumerated. Said another way, the method may determine all the edges or wires that connect the nodes or elements common to both programs (the anchor nodes) to the non-anchor nodes in sub-graph A.

In 708, for each edge enumerated in 706, a corresponding edge that connects a corresponding anchor node in sub-graph B with a corresponding non-anchor node merged from sub-graph A may be added to the second graphical program. In other words, the added nodes may be connected to the non-anchor nodes of the second program, thereby integrating the merged sub-graph A into the second graphical program.

As indicated in 710, if there are further differences, the method may return to 702 and proceed as described above, with the next difference as current. If there are no more differences, the method may terminate, as shown in FIG. 7.

As noted above, in some embodiments, the merge process described above may be at least partially directed by user input. For example, in one embodiment, the user may specify, e.g., on a per difference basis, which of the graphical programs (or, for example, an entirely new graphical program) will receive the merged sub-graph. In other words, for each difference, the user may specify which of the graphical programs is the merge target. This approach may be particularly suited for situations where multiple versions of an application are developed and/or maintained concurrently, and have very similar yet non-identical functionality.

Figure 10:
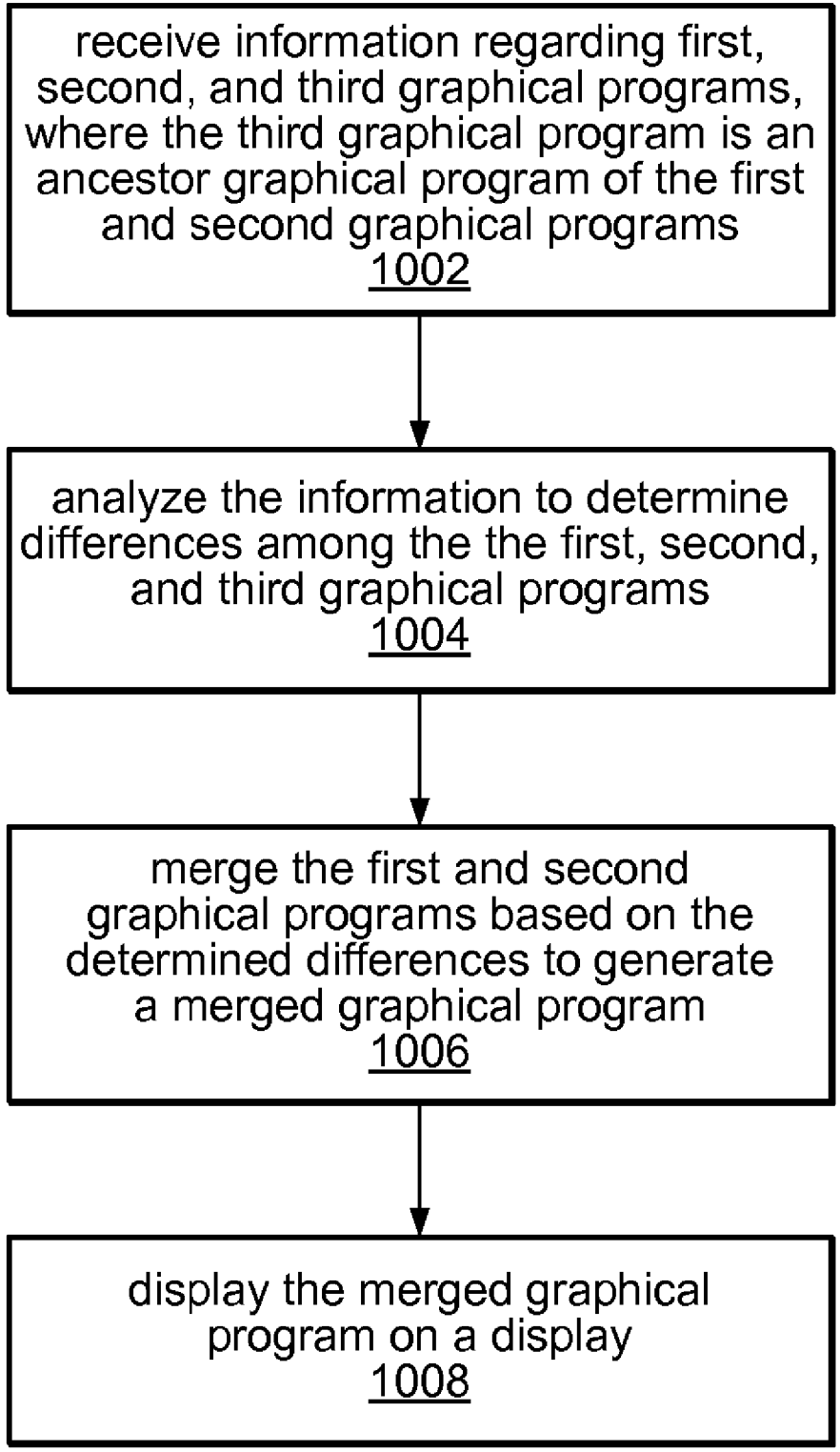
FIG. 10 is a flowchart diagram illustrating one embodiment of a three-way merge process.
Figure 11:
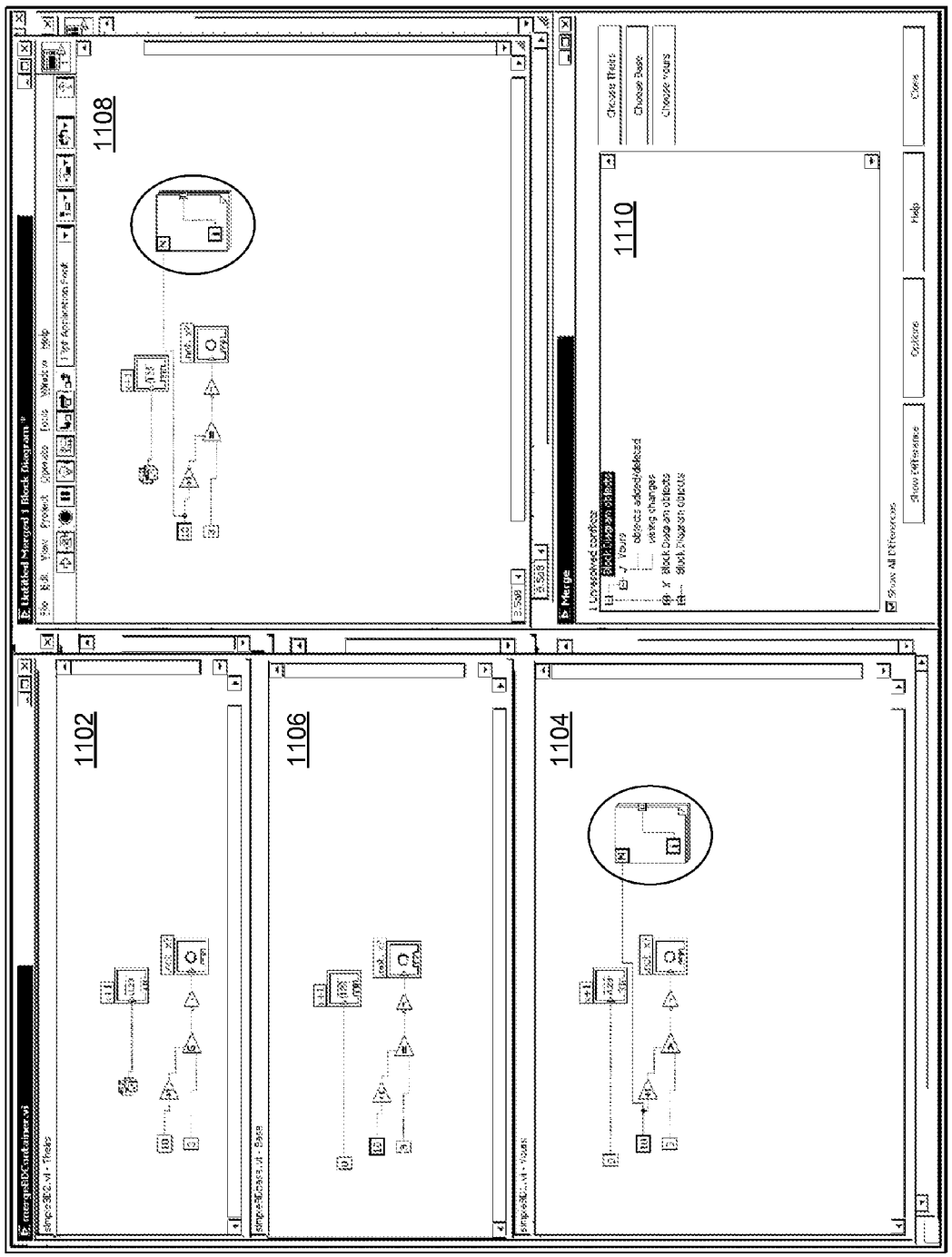
FIGS. 11-13 are exemplary screenshots of a tool or GUI for performing the method of FIG. 10, according to one embodiment.
Figure 12:
Figure 13:
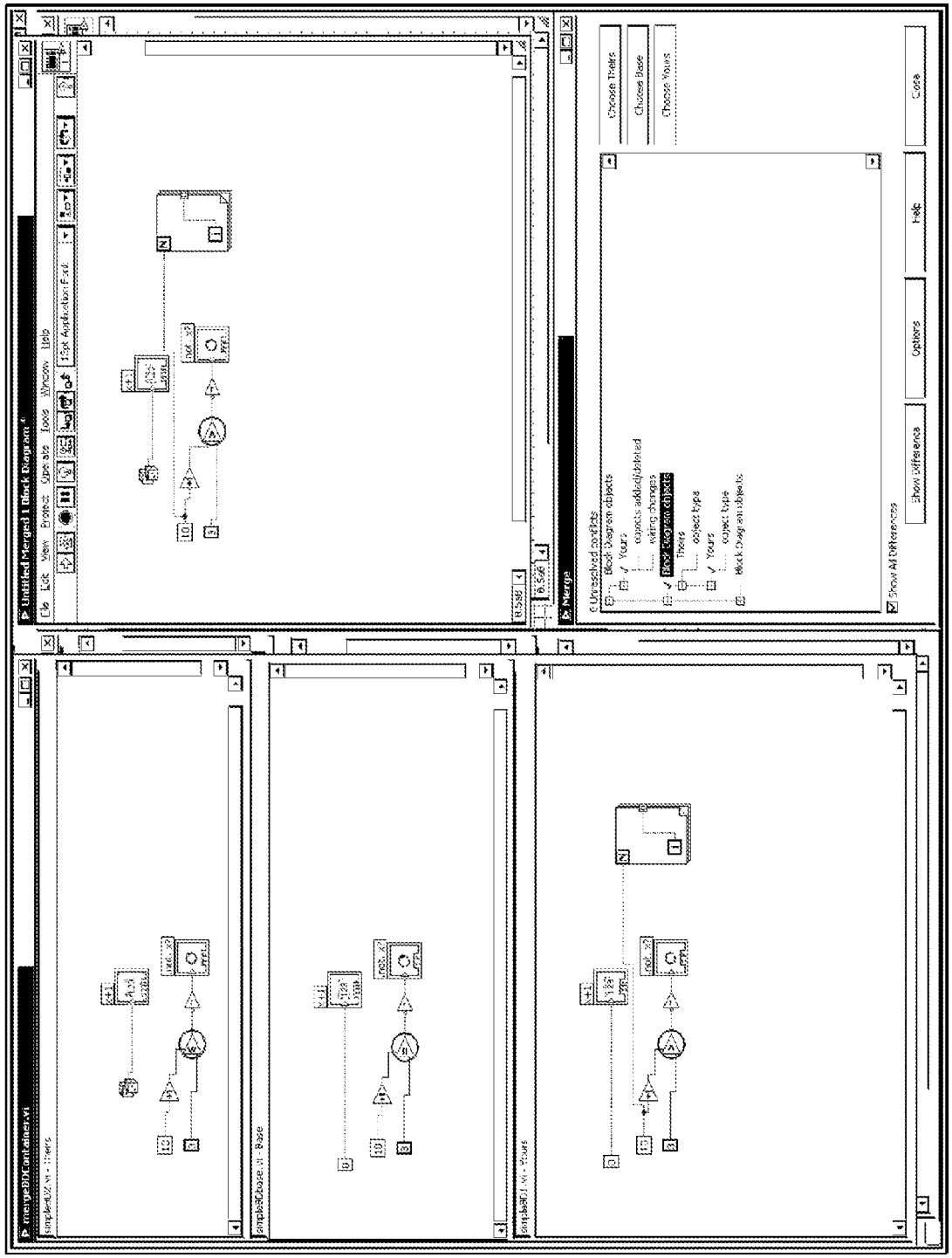

FIGS. 10-13—Merging Graphical Programs Based on an Ancestor Graphical Program As noted above, in some embodiments, merging graphical program may include automatically merging changes between two graphical programs where there is a common ancestor version, e.g., in a development process in which divergent development branches must be reconciled. FIG. 10 is a high level flowchart of such a merge process, according to one embodiment. FIGS. 11-13 are exemplary screenshots illustrating embodiments of various aspects of the merge process.

FIG. 10—Flowchart of a Method for Merging Graphical Programs Based on an Ancestor Graphical Program FIG. 10 is a flowchart of a method for merging graphical programs based on an ancestor graphical program, according to one embodiment. As noted above, in various embodiments, some of the method elements shown may be performed concurrently, in a different order than shown, or may be omitted. Additional method elements may also be performed as desired. As shown, the method may operate as follows:

In 1002, information regarding a first graphical program, a second graphical program, and a third graphical program, may be received. The first graphical program may include a first plurality of interconnected nodes that visually indicate functionality of the first graphical program, the second graphical program may include a second plurality of interconnected nodes that visually indicate functionality of the second graphical program, and the third graphical program may include a third plurality of interconnected nodes that visually indicate functionality of the third graphical program. The third graphical program is preferably an ancestor graphical program of the first and second graphical programs. In other words, both the first and second graphical programs have been derived or developed from the third graphical program. For example, in one embodiment, different developers may have "checked out" respective copies of the third graphical program from a version control system, and performed respective (and likely divergent) modifications on their respective copies, thus generating the first and second graphical programs.

The information may include any of a variety of forms. For example, in various embodiments, the information regarding the first graphical program, the second graphical program, and the third graphical program may include one or more of: the first, second, and/or third, graphical programs, a graph of the first, second, and/or third, graphical programs, a description of the first, second, and/or third, graphical programs, or a data structure specifying the first, second, and/or third, graphical programs, among others. In some embodiments, the information may include any data or structure from which differences among the graphical programs may be determined. In one embodiment, the information may include the differences themselves, e.g., the information may include the results of a graphical difference method or process, such as that described above with reference to FIG. 6.

In 1004, the information may be analyzed to determine differences among the first, second, and third graphical programs. For example, in one embodiment, the analyzing may include analyzing the information to determine first differences between the first graphical program and the third graphical program, and analyzing the information to determine second differences between the second graphical program and the third graphical program. Thus, the determined differences may capture the respective divergent development paths of the first and second graphical programs from the third (parent) program. Thus, each difference is a modification of a respective program (i.e., the first or second program) with respect to the parent program.

In preferred embodiments, the analysis of the information to determine differences among the first, second, and third graphical programs may be performed as described above with reference to FIG. 6. For example, the method of FIG. 6 may be performed with respect to the first and third graphical programs (to determine the first differences), and also with respect to the second and third graphical programs (to determine the second differences). As also described above, any of various kinds of differences may be determined. For example, in various embodiments, the differences determined may include differences between one or more of: nodes, deployment of nodes, implementation code, configuration data, or hardware devices associated with nodes, e.g., target devices for deployment of the nodes. Differences between nodes may include differences in one or more of: number and types of the nodes, versions of the nodes, configuration of the nodes, source code of the nodes, sub-nodes of the nodes, or deployment of the nodes, among others.

As discussed above, in one embodiment, the differences may include differences in interconnectivity of nodes. For example, the differences in interconnectivity of nodes may include differences in one or more of: data flow between nodes, signal flow between nodes, control flow between nodes, dependencies between nodes, calling relationships between nodes, or physical connectivity between hardware devices associated with nodes, among others.

As also described above, in some embodiments, wherein said analyzing the information to determine the differences is performed in accordance with specified difference criteria. In other words, analyzing the information to determine differences among the graphical programs may be performed in accordance with specified difference criteria, such as, for example, tolerance, category, cost, or performance, among other criteria. Moreover, the method may include receiving user input specifying the difference criteria to be used in the analysis.

In one embodiment, the user input specifying the difference criteria may include user input specifying respective portions of the first, second, and/or third graphical programs for analysis, and analyzing the information to determine the differences, and merging may be performed with respect to the specified portions of the first, second, and/or third graphical programs. For example, the user may select the regions to be considered with a pointing device, e.g., by drawing a bounding box or other bounding curve around the desired portions, or by clicking on desired portions or elements, e.g., with the control key down, among other selection techniques. Thus, the user may specify some subset (or subsets) of the graphical programs to merge. This feature may be used to perform partial merges of programs, to quickly merge large programs that differ only in a few known regions, etc.

As indicated in 1006, the first graphical program and the second graphical program may then be merged based on the determined differences to generate a merged graphical program. Note that in the descriptions herein, the term "merged graphical program" is used to denote not only the final result of the merge process, but to intermediate forms of the program that occur during the merge process. In some embodiments where the analyzing of 1004 determines first and second differences, as described above, the merging may be performed based on the first and second differences. For example, the merging may include, for each difference of at least a subset of the first and second differences: if the difference does not conflict with any others of the first and second differences, incorporating the difference into the merged graphical program, e.g., automatically; however, if the difference conflicts with another difference of the first and second differences, the user may be prompted to resolve the conflict, user input may be received resolving the conflict, including specifying one or more modifications to the merged graphical program, and the merged graphical program may be modified in accordance with the specifying.

Note that two differences are considered to conflict if they affect the same part of the original graphical program in such a way that both changes cannot be applied at the same time without compromising each other. Thus, the differences may be analyzed in pairs. For example, in one embodiment, each difference of the first differences may be processed by comparing it to each difference of the second differences to determine if the pair conflicts or not.

In one embodiment, the user may specify the one or more modifications to the merged graphical program by selecting one of the difference or the other difference for incorporation into the merged graphical program, and the merging may include incorporating the selected difference into the merged graphical program. In other words, the user may select which of the conflicting differences to use, and the method may modify the merged graphical program to include the selected difference, e.g., automatically.

In another embodiment, the user may specify the one or more modifications to the merged graphical program by manually editing the merged graphical program, e.g., using a graphical program editor (under the development environment), to resolve the conflict. For example, the user may examine the conflicting differences (i.e., the difference and the other difference) and manually determine and make modifications to the merged graphical program that best serve the intent of the developer. For example, the modifications may attempt to accommodate or preserve the intended functionality of both differences while avoiding or ameliorating the conflict, or may implement a compromise, e.g., that minimizes the consequences of not including both differences in the merged graphical program. Alternatively, the user may determine and implement a modification that provides a solution that obviates or replaces the two differences. In other embodiments, the user may modify the merged graphical program as needed or desired. Thus, the method may include resolving conflicts (between differences) by letting the user choose one of the differences and/or make edits to the merged graphical program.

Note that in various embodiments, the merged graphical program may be generated from a copy of the third program, or generated from scratch, e.g., adding all elements from the first and second graphical programs that are common to both programs, then merging the differences as described above. In a preferred embodiment, prior to merging, the merged graphical program may include or be a copy of the third graphical program, where merging includes modifying the copy of the third graphical program. In alternate embodiments, a copy of the first or second graphical program may be used as a basis for the merged graphical program.

Note that when the user has selected a difference to include in or merge into the merged graphical program, the selected difference may be incorporated into the merged graphical program in the manner described above with respect to the dual merge process of FIGS. 5-9B. For example, in one embodiment, the first, second, and third graphical programs may each include or be considered as respective first, second, and third graphs, where each difference includes or is a respective source sub-graph that includes one or more nodes and zero or more edges in the first or second graph (depending on which of the first and second graphical programs is being considered, difference-wise), and a respective target sub-graph comprising one or more nodes and zero or more edges in the third graph, and where nodes common to the first or second graph and the third graphical programs are or may be considered to be anchor nodes. Incorporating the selected difference into the merged graphical program may then include removing all non-anchor nodes and connections thereto in the target sub-graph from the merged graphical program, adding all non-anchor nodes and connections thereto in the source sub-graph to the merged graphical program, determining all edges in the source sub-graph that connect anchor nodes to non-anchor nodes, and for each determined edge, adding to the merged graphical program an edge that connects a corresponding anchor node in the target sub-graph with a corresponding non-anchor node added from the source sub-graph, as described above with reference to FIG. 7. Note that various embodiments of the method of FIG. 10 may include any of the features or techniques discussed above with respect to FIGS. 5-7.

This approach may also be used to merge or incorporate the various differences that don't conflict into the merged graphical program. For example, with respect to the first differences (between the first graphical program and the third graphical program), each of the first differences that does not conflict with any of the second differences may be incorporated into the merged graphical program as described above, where each difference includes or is a respective source sub-graph that includes one or more nodes and zero or more edges in the first graph (corresponding to the first graphical program). Each of the second differences (between the second graphical program and the third graphical program), may similarly be merged into the graphical program as described above, where each difference includes or is a respective source sub-graph that includes one or more nodes and zero or more edges in the second graph (corresponding to the second graphical program).

Finally, in 1008, the merged graphical program may be displayed on a display device, e.g., a computer monitor. In one embodiment, displaying the merged graphical program may include graphically indicating at least a portion of the differences among the first, second, and third graphical programs in the merged graphical program, e.g., as described above in 508 with reference to FIG. 5. For example, the differences may be indicated via one or more of highlighting, a plurality of colors, a plurality of line styles, or moving dashed lines, among other types of indicators. In one embodiment, displaying the merged graphical program may include displaying a textual description of at least a portion of the differences, e.g., indicating from which of the first and second graphical programs the difference originated, whether the difference were modified, etc., as desired.

Note that the merged graphical program may subsequently be edited or otherwise manipulated. For example, user input modifying the merged graphical program may be received in response to graphically indicating the differences. Thus, the user may edit or tweak the resultant merged graphical program as desired, e.g., to streamline ungainly graphical program code, rearrange the code for readability, annotate portions of the code, etc., as desired.

In one embodiment, diff/merge information for each of a plurality of actions performed by the user and/or by the method may be stored, after which user input invoking one or more undo operations based on the stored diff/merge information may be received, where the one or more undo operations correspond respectively to one or more of the plurality of actions. Moreover, in some embodiments, user input invoking one or more redo operations based on the stored diff/merge information may be received, where the one or more redo operations correspond respectively to one or more of the one or more undo operations. Thus, the user may undo/redo any of the actions performed by the user and/or by the merge method described herein, thereby providing the user with a powerful and flexible tool to manage the merge process, which may be increasingly important as the size and complexity of the graphical programs grow.

Thus, in summary, given an original graphical program and two others that have been changed from the original, embodiments of the three-way merge process described above may use all three graphical programs to produce a fourth, merged, graphical program that incorporates changes from both of the changed graphical programs, where changes that do not conflict are automatically merged, and where user input resolves those changes that do conflict.

FIGS. 11-13 illustrate exemplary screenshots of a tool or graphical user interface (GUI) for performing the above three-way merge process, according to one embodiment. It should be noted, however, that the tool/GUI is meant to be illustrative only, and is not intended to limit the tool or GUI (or method) to any particular form, function, or appearance.

As FIG. 11 shows, the three graphical programs are displayed in respective windows at the far left of the figure, where the top program 1102, labeled "Theirs", may be considered to be the first graphical program mentioned with respect to FIG. 10, the bottom program 1104, labeled "Yours", may be considered to be the second graphical program, and the middle program 1106, labeled "Base", may be considered to be the third graphical program, i.e., the parent of the first and second graphical programs. Thus, the original and two changed versions of the graphical program are each displayed. A resultant merged graphical program 1108 is displayed just to the right of the first (Theirs) and third (Base) programs. Note that programs 1104 and 1108 each indicates a difference with the original program 1106 via an oval outline drawn around the respective additional program components.

As may be seen, in this embodiment, a list of changes and conflicts 1110 are displayed below the merged program, in the form of an expandable tree structure. Note that a non-conflicting change that was automatically resolved by the three-way merge tool is shown selected and displayed, specifically, changes in block diagram objects in program 1102 (Yours, or first), including both addition or deletion of objects (nodes) and wiring changes among nodes.

FIG. 12 is an exemplary screenshot of the tool or GUI of FIG. 11, where a conflict is shown selected and displayed. In this exemplary case, the conflicting differences are between block diagram objects, e.g., nodes, specifically, between object types. As may be seen, in this embodiment, the merge tool or GUI includes controls 1112 whereby the user may select one of the differences to include via "Choose Theirs"

and "Choose Yours" buttons, or may select the corresponding portion of the original base program 1106 via a "Choose Base" button. Of course, in other embodiments, any change selection means may be used as desired. Moreover, as noted above, in some embodiments, the user may simply invoke an editor and modify the merged program directly to resolve a conflict.

FIG. 13 is an exemplary screenshot of the tool or GUI of FIGS. 11 and 12, where the user has chosen to resolve the conflict by choosing the difference of graphical program 1102 (Yours), denoted by a checkmark beside "Yours" under the selected conflict in the list, although it should be noted that in other embodiments, other indications may be used as desired. Thus, the type conflict has been resolved by using the object type of graphical program 1102.

Thus, various embodiments of the merge process described above may be used to generate a merged graphical program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method for merging graphical programs, the method comprising:
utilizing a computer to perform:
receiving information regarding a first graphical program, a second graphical program, and a third graphical program, wherein the first graphical program comprises a first plurality of interconnected nodes that visually indicate functionality of the first graphical program, wherein the second graphical program comprises a second plurality of interconnected nodes that visually indicate functionality of the second graphical program, wherein the third graphical program comprises a third plurality of interconnected nodes that visually indicate functionality of the third graphical program, and wherein the third graphical program is an ancestor graphical program of the first and second graphical programs;
analyzing the information to determine differences among the first, second, and third graphical programs;
merging the first graphical program and the second graphical program based on the determined differences to generate a merged graphical program, wherein the first, second, and third graphical programs comprise respective first, second, and third graphs, wherein each difference comprises a respective source sub-graph comprising one or more nodes and zero or more edges in the first or second graph, and a respective target sub-graph comprising one or more nodes and zero or more edges in the third graph, wherein nodes common to the first or second graph and the third graphical programs comprise anchor nodes, and wherein said merging comprises:
removing all non-anchor nodes and connections thereto in the target sub-graph from the merged graphical program;
adding all non-anchor nodes and connections thereto in the source sub-graph to the merged graphical program;
determining all edges in the source sub-graph that connect anchor nodes to non-anchor nodes; and
for each determined edge, adding to the merged graphical program an edge that connects a corresponding anchor node in the target sub-graph with a corresponding non-anchor node added from the source sub-graph; and
displaying the merged graphical program on a display device.

2. The computer-implemented method of claim 1, wherein said analyzing comprises:
analyzing the information to determine first differences between the first graphical program and the third graphical program; and
analyzing the information to determine second differences between the second graphical program and the third graphical program;
wherein said merging is performed based on the first and second differences.

3. The computer-implemented method of claim 2, wherein said merging comprises:
for each difference of at least a subset of the first and second differences:
if the difference does not conflict with any others of the first and second differences, incorporating the difference into the merged graphical program; and
if the difference conflicts with another difference of the first and second differences:
prompting the user to resolve the conflict;
receiving user input resolving the conflict, including specifying one or more modifications to the merged graphical program; and
modifying the merged graphical program in accordance with said specifying.

4. The computer-implemented method of claim 3, wherein prior to said merging, the merged graphical program comprises a copy of the third graphical program, and wherein said merging comprises modifying the copy of the third graphical program.

5. The computer-implemented method of claim 4, wherein said specifying one or more modifications to the merged graphical program comprises one of:
selecting one of the difference or the other difference for incorporation into the merged graphical program, wherein said merging comprises incorporating the selected difference into the merged graphical program; or
manually editing the merged graphical program.

6. The computer-implemented method of claim 4, wherein each determined difference comprises a respective source sub-graph comprising one or more nodes and zero or more edges in the first graph.

7. The computer-implemented method of claim 4, wherein each determined difference comprises a respective source sub-graph comprising one or more nodes and zero or more edges in the second graph.

8. The computer-implemented method of claim 2,
wherein said analyzing the information to determine first differences comprises traversing the first and third graphical programs to determine the first differences; and
wherein said analyzing the information to determine second differences comprises traversing the second and third graphical programs to determine the second differences.

9. The computer-implemented method of claim 2,
wherein said analyzing the information to determine first differences comprises:
creating one or more first data structures which include information regarding the first plurality of interconnected nodes in the first graphical program and the third plurality of interconnected nodes in the third graphical program; and comparing the one or more first data structures to determine the first differences; and wherein said analyzing the information to determine second differences comprises:

creating one or more second data structures which include information regarding the second plurality of interconnected nodes in the second graphical program and the third plurality of interconnected nodes in the third graphical program; and comparing the one or more second data structures to determine the second differences.

10. The computer-implemented method of claim 9, wherein the one or more first data structures comprise one or more directed graphs comprising a plurality of vertices connected by edges, wherein each of the vertices represents one of the nodes in a respective one of the first and third graphical programs; and wherein the one or more second data structures comprise one or more directed graphs comprising a plurality of vertices connected by edges, wherein each of the vertices represents one of the nodes in a respective one of the second and third graphical programs.

11. The computer-implemented method of claim 1, wherein said displaying comprises graphically indicating at least a portion of the differences among the first, second, and third graphical programs in the merged graphical program.

12. The method of claim 11, further comprising:

utilizing the computer to perform:

receiving user input modifying the merged graphical program in response to said graphically indicating.

13. The computer-implemented method of claim 11, wherein said graphically indicating graphically indicating at least a portion of the differences among the first, second, and third graphical programs comprises indicating differences using one or more of:

highlighting;

a plurality of colors;

a plurality of line styles; or moving dashed lines.

14. The computer-implemented method of claim 1, wherein the differences comprise differences between one or more of:

nodes;

deployment of nodes;

implementation code;

configuration data; or hardware devices associated with nodes.

15. The computer-implemented method of claim 14, wherein the hardware devices associated with nodes comprise target devices for deployment of the nodes.

16. The computer-implemented method of claim 14, wherein the differences between nodes comprise differences in one or more of:

number and types of the nodes;

versions of the nodes;

configuration of the nodes;

source code of the nodes;

sub-nodes of the nodes; or deployment of the nodes.

17. The computer-implemented method of claim 1, wherein the differences comprise:

differences in interconnectivity of nodes.

18. The computer-implemented method of claim 17, wherein the differences in interconnectivity of nodes comprise differences in one or more of:

data flow between nodes;

signal flow between nodes;

control flow between nodes;

dependencies between nodes;

calling relationships between nodes; or physical connectivity between hardware devices associated with nodes.

19. The computer-implemented method of claim 1, wherein the information regarding the first graphical program, the second graphical program, and the third graphical program comprises one or more of:

the first, second, and/or third, graphical programs;

a graph of the first, second, and/or third, graphical programs;

a description of the first, second, and/or third, graphical programs; or a data structure specifying the first, second, and/or third, graphical programs.

20. The computer-implemented method of claim 1, wherein said displaying the merged graphical program further comprises:

displaying a textual description of at least a portion of the differences.

21. The computer-implemented method of claim 1, wherein said analyzing the information to determine the differences is performed in accordance with specified difference criteria.

22. The computer-implemented method of claim 21, wherein specified difference criteria comprise one or more of:

tolerance;

category;

cost; or performance.

23. The computer-implemented method of claim 21, further comprising:

utilizing the computer to perform:

receiving user input specifying the difference criteria.

24. The computer-implemented method of claim 23, wherein the user input specifying the difference criteria comprises user input specifying respective portions of the first, second, and/or third graphical programs for analysis; and wherein said analyzing the information to determine the differences and said merging are performed with respect to the specified portions of the first, second, and/or third graphical programs.

25. The computer-implemented method of claim 1, further comprising:

utilizing the computer to perform:

storing diff/merge information for each of a plurality of actions performed by the user and/or by the method; and receiving user input invoking one or more undo operations based on the stored diff/merge information, wherein the one or more undo operations correspond respectively to one or more of the plurality of actions.

26. The computer-implemented method of claim 25, further comprising:

utilizing the computer to perform:

receiving user input invoking one or more redo operations based on the stored diff/merge information, wherein the one or more redo operations correspond respectively to one or more of the one or more undo operations.

27. A system for merging graphical programs, the system comprising:
a processor; and
a memory medium coupled to the processor; and
a display device;
wherein the memory stores program instructions executable by the processor to:
receiving information regarding a first graphical program, a second graphical program, and a third graphical program, wherein the first graphical program comprises a first plurality of interconnected nodes that visually indicate functionality of the first graphical program, wherein the second graphical program comprises a second plurality of interconnected nodes that visually indicate functionality of the second graphical program, wherein the third graphical program comprises a third plurality of interconnected nodes that visually indicate functionality of the third graphical program, and wherein the third graphical program is an ancestor graphical program of the first and second graphical programs;
analyzing the information to determine differences among the first, second, and third graphical programs;
merging the first graphical program and the second graphical program based on the determined differences to generate a merged graphical program, wherein the first, second, and third graphical programs comprise respective first, second, and third graphs, wherein each difference comprises a respective source sub-graph comprising one or more nodes and zero or more edges in the first or second graph, and a respective target sub-graph comprising one or more nodes and zero or more edges in the third graph, wherein nodes common to the first or second graph and the third graphical programs comprise anchor nodes, and wherein said merging comprises:
removing all non-anchor nodes and connections thereto in the target sub-graph from the merged graphical program;
adding all non-anchor nodes and connections thereto in the source sub-graph to the merged graphical program;
determining all edges in the source sub-graph that connect anchor nodes to non-anchor nodes; and
for each determined edge, adding to the merged graphical program an edge that connects a corresponding anchor node in the target sub-graph with a corresponding non-anchor node added from the source sub-graph; and
displaying the merged graphical program on a display device.

28. A non-transitory computer-accessible memory medium storing program instructions for merging graphical programs, wherein the program instructions are executable by a processor to perform:
receiving information regarding a first graphical program, a second graphical program, and a third graphical program, wherein the first graphical program comprises a first plurality of interconnected nodes that visually indicate functionality of the first graphical program, wherein the second graphical program comprises a second plurality of interconnected nodes that visually indicate functionality of the second graphical program, wherein the third graphical program comprises a third plurality of interconnected nodes that visually indicate functionality of the third graphical program, and wherein the third graphical program is an ancestor graphical program of the first and second graphical programs;
analyzing the information to determine differences among the first, second, and third graphical programs;
merging the first graphical program and the second graphical program based on the determined differences to generate a merged graphical program, wherein the first, second, and third graphical programs comprise respective first, second, and third graphs, wherein each difference comprises a respective source sub-graph comprising one or more nodes and zero or more edges in the first or second graph, and a respective target sub-graph comprising one or more nodes and zero or more edges in the third graph, wherein nodes common to the first or second graph and the third graphical programs comprise anchor nodes, and wherein said merging comprises:
removing all non-anchor nodes and connections thereto in the target sub-graph from the merged graphical program;
adding all non-anchor nodes and connections thereto in the source sub-graph to the merged graphical program;
determining all edges in the source sub-graph that connect anchor nodes to non-anchor nodes; and
for each determined edge, adding to the merged graphical program an edge that connects a corresponding anchor node in the target sub-graph with a corresponding non-anchor node added from the source sub-graph; and
displaying the merged graphical program on a display device.

* * * * *